US008174541B2

(12) United States Patent
Greene et al.

(10) Patent No.: US 8,174,541 B2
(45) Date of Patent: May 8, 2012

(54) DIVIDING THREE-DIMENSIONAL SPACE INTO LOCATION BASED VIRTUAL PACKETS

(75) Inventors: Richard Greene, Winchester (GB); Conor P. Beverland, Chicago, IL (US); Florence Hirondel, Uccle (BE); Ailun Yi, Edinburgh (GB); Tim Kock, Bramberg am Wildkogel (AT)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 12/355,898

(22) Filed: Jan. 19, 2009

(65) Prior Publication Data

US 2010/0185959 A1    Jul. 22, 2010

(51) Int. Cl.
*G09G 5/00*    (2006.01)
(52) U.S. Cl. .................... 345/619; 345/660; 345/632
(58) Field of Classification Search .................. None
See application file for complete search history.

(56) References Cited

OTHER PUBLICATIONS

Jong Ha Hwang et al, "An XML-Based 3-Dimensional Graphic Database System", Lecture Notes in Computer Science, 2001, vol. 2105/2001, p. 454-467.*

Jong Ha Hwang et al, "3DGML: A 3-Dimensional Graphic InformationRetrieval System", Lecture Notes in Computer Science, 2001, vol. 2198/2001, p. 282-291.*
"Virtual World Creation with WorldPerfect," MetaVR WorldPerfect-3D Virtual World Creation, www.metavr.com/products/worldperfect/worldperfect.html, Feb. 15, 2008.
"Active Worlds Browser 4.1," www.web.archive.org/web/20080125035532/http://www.bestsoftware4download.com/software/t-free-active-worlds-browser-download-kjketyrj.html, Jan. 2008.
"Home of the 3D Chat, Virtual Worlds Building Platform," Activeworlds Inc., htttp://www.activeworlds.com, Feb. 15, 2008.
"Activeworlds Products," Activeworlds Inc., http://www.activeworlds.com/products/index.asp, Feb. 15, 2008.
"Avilon World Studio 98 1.20," htttp://www.freedownloadscenter.com/Web_Authoring/Misc_Web_Authorizing_Tools/Avilon_World_Studio_98.html, Feb. 15, 2008.

* cited by examiner

*Primary Examiner* — Kee M Tung
*Assistant Examiner* — Weiming He
(74) *Attorney, Agent, or Firm* — Thomas E. Lees, LLC

(57) ABSTRACT

The invention provides a method and system for three-dimensional virtual world pattern positioning. The method includes creating a three-dimensional pattern for a virtual world environment, sub-dividing the pattern into a plurality of sub-divisions each having a vector relative to a center of the pattern, creating a transform including a description of the pattern and shape information for each sub-division, creating a portion of a virtual world environment by positioning the pattern and sub-divisions, and storing the transform for reusing the pattern and sub-divisions in another virtual world environment.

20 Claims, 15 Drawing Sheets

DIVIDING THREE-DIMENSIONAL SPACE INTO LOCATION BASED VIRTUAL PACKETS

BACKGROUND OF THE INVENTION

1. Field of the Invention

The present invention relates generally to virtual world environments, and in particular to pattern creation and positioning in a virtual world environment.

2. Background Information

As internet based 3-D virtual worlds (VW) become more and more ubiquitous, individuals and businesses across a variety of industries are creating a presence in these worlds for many purposes including social networking, advertising and sales. Users of these VWs are able to create objects, services and a plurality of other business opportunities "in world" that could help the individual or company gain revenue, launch products or services, and provide customers with a rich information base for learning and buying opportunities.

At the moment, creating layouts for use in virtual-worlds requires the careful planning and placement of each element in the three-dimensional space. The items in the layout are independent of each other and modifying or replacing the layout requires manually altering the position of each item that needs to be moved to accommodate the new design. This process is time-consuming and inefficient in managing 3-D content. Additionally, layouts are designed in particular virtual worlds and once implemented there remain tied to that particular implementation. Builds cannot be transported from one world to another and re-used, requiring duplication of effort and incurring the full build and design costs for each virtual world, as well as becoming obsolete following loss of interest/usage in the virtual world they were created in.

Existing layout packages provide sophisticated ways of designing store layouts but are not designed to integrate this information with creating instances of the stores in virtual worlds. Nor do they allow for the association of the business logic that a store requires to be able to function and complete commercial transactions. Some simple tools for automated building exist in virtual worlds but these are not tied in to a full commercial system, nor do they allow for easy management of content and design from outside of the virtual world, or in a format not dependant on the virtual world in question.

SUMMARY OF THE INVENTION

The invention provides a method and system for three-dimensional virtual world pattern positioning. The method includes creating a three-dimensional pattern for a virtual world environment, sub-dividing the pattern into a plurality of sub-divisions each having a vector relative to a center of the pattern, creating a transform including a description of the pattern and shape information for each sub-division, creating a portion of a virtual world environment by positioning the pattern and sub-divisions, and storing the transform for reusing the pattern and sub-divisions in another virtual world environment.

Another embodiment involves a system for creating and reusing virtual world patterns. The system includes an assembly module configured to: create a three-dimensional pattern for a virtual world environment, sub-divide the pattern into a plurality of sub-divisions each having a vector relative to a center of the pattern, and create a transform including a description of the pattern and shape information for each sub-division; a model builder module configured to: build a portion of a virtual world environment by positioning the pattern and sub-divisions; and store the transform for reusing the pattern and sub-divisions for another virtual world environment in a memory.

Yet another embodiment involves a computer program product for three-dimensional virtual world pattern positioning, create a three-dimensional pattern for a virtual world environment, sub-divide the pattern into a plurality of sub-divisions each having a vector relative to a center of the pattern, create a transform including a description of the pattern and shape information for each sub-division, create a portion of a virtual world environment by positioning the pattern and sub-divisions, and store the transform for reusing the pattern and sub-divisions in another virtual world environment.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation, including meanings implied from the specification as well as meanings understood by those skilled in the art and/or as defined in dictionaries, treatises, etc.

The description may disclose several preferred embodiments of creating location based virtual packets for use and re-use in a virtual world environment, as well as operation and/or component parts thereof. While the following description will be described in terms of virtual world patterns for clarity and to place the invention in context, it should be kept in mind that the teachings herein may have broad application to all types of systems, devices and applications.

The invention provides a method and system for three-dimensional virtual world pattern positioning. The method includes creating a three-dimensional pattern for a virtual world environment, sub-dividing the pattern into a plurality of sub-divisions, each having a vector relative to a center of the pattern, creating a transform including a description of the pattern and shape information for each sub-division, creating a portion of a virtual world environment by positioning the pattern and sub-divisions, and storing the transform for reusing the pattern and sub-divisions in another virtual world environment.

Figure 1:
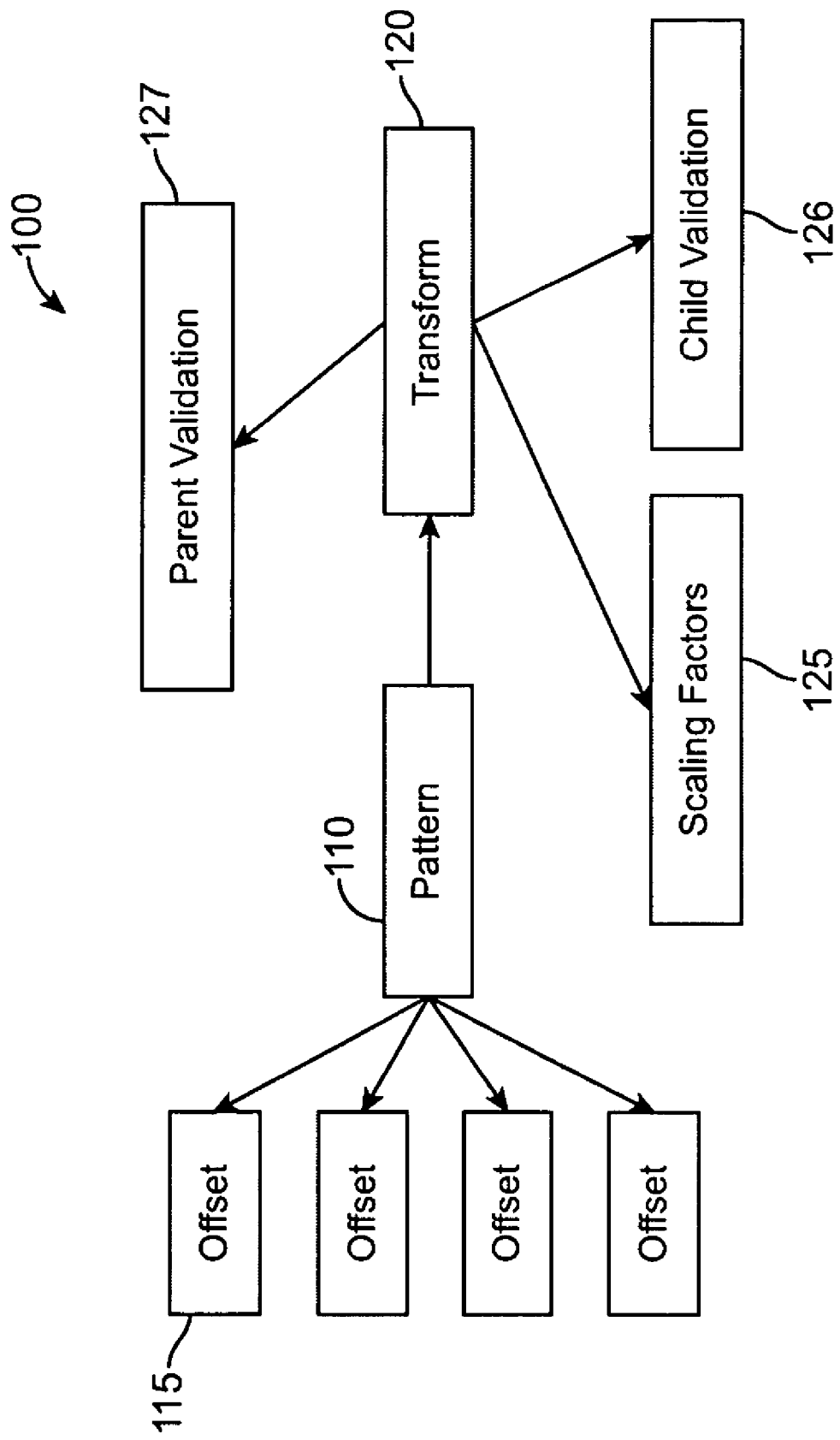
FIG. 1 illustrates a block diagram showing the relationship between patterns and transforms according to one embodiment of the invention.

FIG. 1 illustrates a block diagram showing the relationship 100 between patterns and transforms according to one embodiment of the invention. The pattern 110 is the core unit of positioning allocation. Each pattern 110 has a set offsets 115 associated with it. These offsets 115 describe where the pattern 110 will allow children patterns to be placed relative to their Parent. In one embodiment of the invention, the pattern 110 takes the form of <x, y, z> coordinate vectors. Each pattern 110 also has a transform 120 associated with it. The transform 120 maintains the Parent/Child validation data 127/126 and the scaling factors 125 for moving from Parent down to Child.

In one embodiment of the invention, the offsets 115 are arranged around the center point of the existing pattern 110. As each offset 115 forms the center of a new sub-area, it becomes the center of the pattern applied to divide that area in turn. In one embodiment of the invention, the information to make up the patterns 110 and transforms 120 are stored in XML files and are loaded up at run time as required. It should be noted that other embodiments of the invention can store the patterns 110 and transforms 120 in other types of files.

In one embodiment of the invention, when the model builder module 2020 (see FIG. 20) runs, it receives commerce data from a source, such as a back-end system. The top level categories are assigned offsets 115 in the first pattern 110 being applied. For each of those top levels, a new pattern 110 is applied to the area allocated to it and any sub-categories are given offsets 115 based on that new pattern 110. This procedure is applied recursively until all of the sub-categories or products have been allocated. At each stage, nodes from the structure module 2030 (see FIG. 20) are created and given the offsets 115 to keep track of, as well as the category or product that they correspond to. When the area is sub-divided, the new nodes are added as children of the existing node to form a tree structure.

Figure 2:
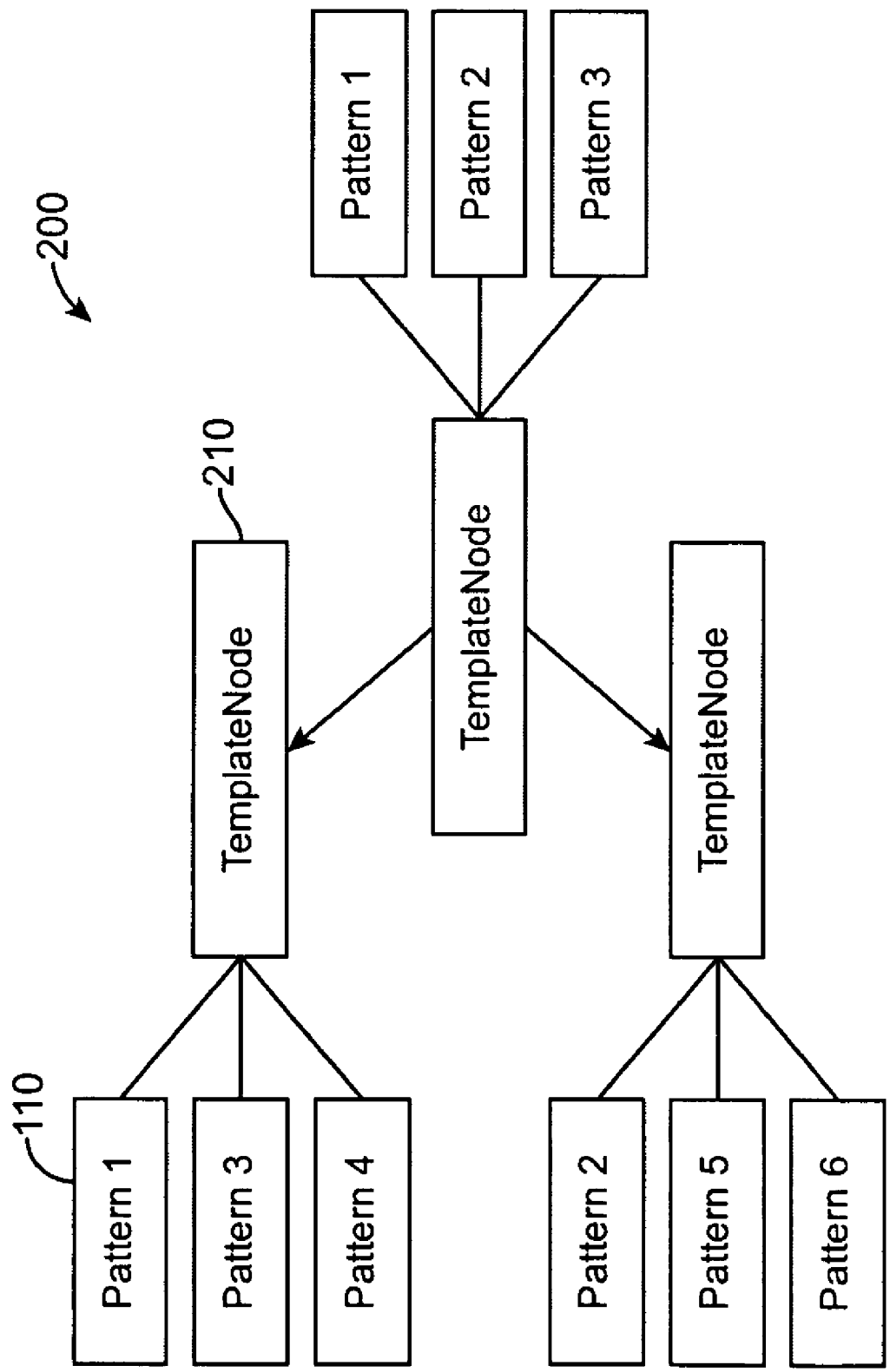
FIG. 2 illustrates a block diagram showing the relationship between patterns and template nodes according to an embodiment of the invention.

FIG. 2 illustrates a block diagram showing the relationship 200 between patterns 110 and template nodes 210 according to an embodiment of the invention. When using the automated system according to one embodiment of the invention, the model builder module 2020 (see FIG. 20) reads in the commerce data. To do this, the model builder module 2020 of FIG. 20 builds up a set of data nodes. The data nodes build the commerce information into a node hierarchy, similar to one that is created by the structure module 2030 (see FIG. 20). This hierarchy allows for gathering more information about how the data in the commerce is structured. The information about the structure of this information, the hierarchy of categories and contents, are passed to the template nodes 210 by the model builder 2020 of FIG. 20 to determine what patterns 110 to apply to them. These patterns 110 are then used to build the structure output of a virtual world environment, such as a virtual store, for use by a virtual world.

In one embodiment of the invention, the template nodes 210 perform a series of processing on the information passed to them about the commerce data structure. In one embodiment of the invention, the template nodes 210 determine whether they are dealing with a set of categories or of products; the template nodes 210 may also determine how many entries have to be accommodated at the current level; the template nodes 210 may determine the position that the current area was allocated in the pattern 110 that allocated its offset 115. Based on all of this information, the template nodes 210 determine which pattern 110 to output for use at the current level of a virtual world environment. Each node has a set of determinations and patterns 110, and may have connections to other template nodes 210 as well. When outputting a pattern 110, the template nodes 210 can request the model builder module 2020 of FIG. 20 to move down into another template node 210, to give different behaviors for different levels of the overall layout of the virtual world environment.

In one embodiment of the invention at each level, the template node 210 has a particular behavior in response to a unique set of determined results. The template node 210 outputs a particular pattern 110, and potentially passes back a reference to another template node 210. Each behavior has a set of criteria associated with it, and is chosen if that criteria are met. In one embodiment, there is no way for more than one behavior's set of criteria to be met at the same time. Since the criteria associated with a template node 210 are dynamically created at run-time, as required by the template node's configuration data, the list of criteria can easily be extended. This is so that a user can add to the system and tailor it to their specific needs.

Figure 3:
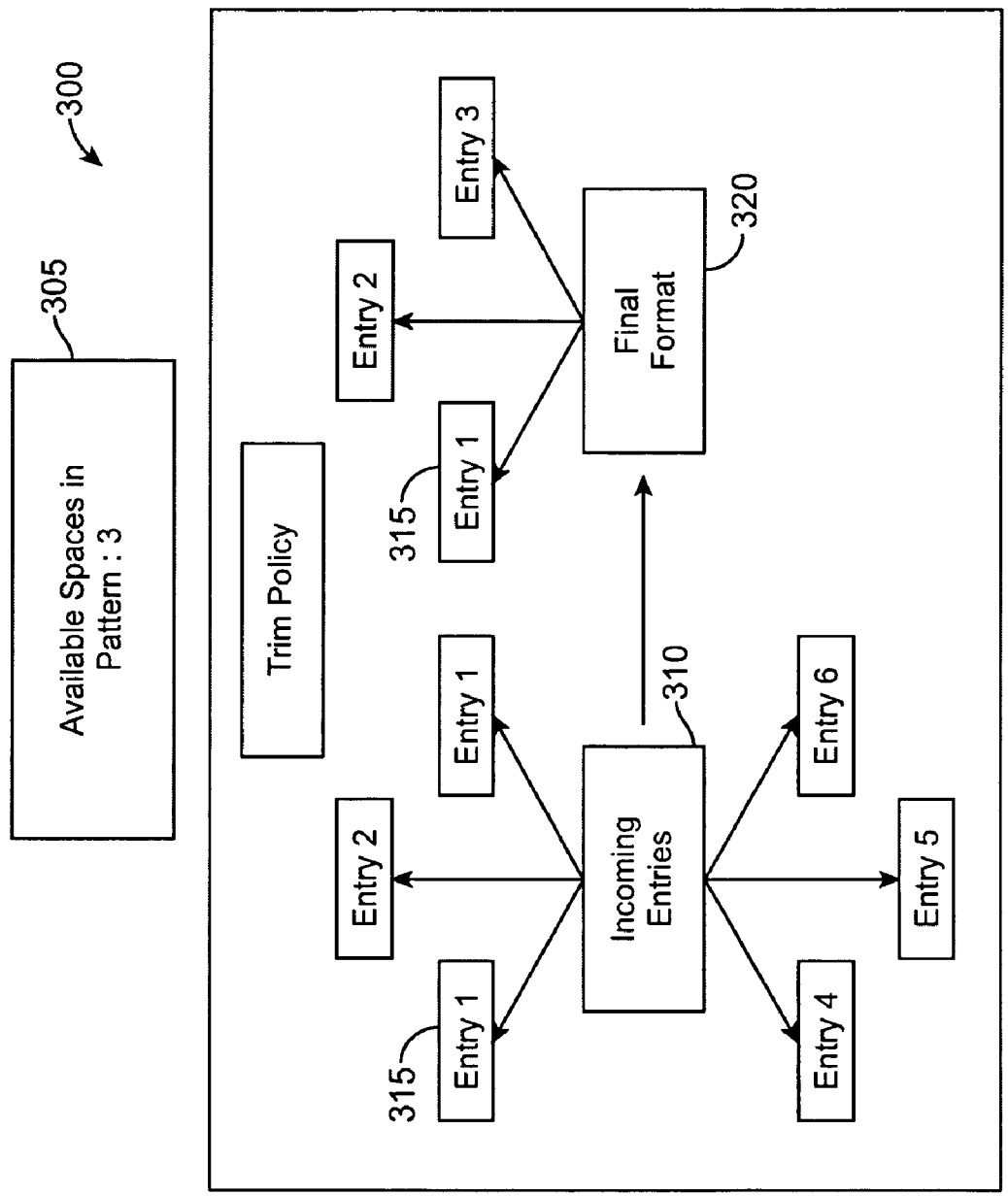
FIG. 3 illustrates a block diagram showing a trim policy according to an embodiment of the invention.

FIG. 3 illustrates a block diagram showing a trim policy 300 example with the available spaces in a pattern 305 being three (3), according to an embodiment of the invention. In one embodiment of the invention, for handling more incoming commerce entries 315 than there are spaces in the pattern 110 being used, an excess handler module in the builder module 220 uses two different modes of operation. In one embodiment of the invention, the excess handler module discards some incoming entries 310 until the remaining entries 315 fit the pattern 110 for the final format 320.

Figure 4:
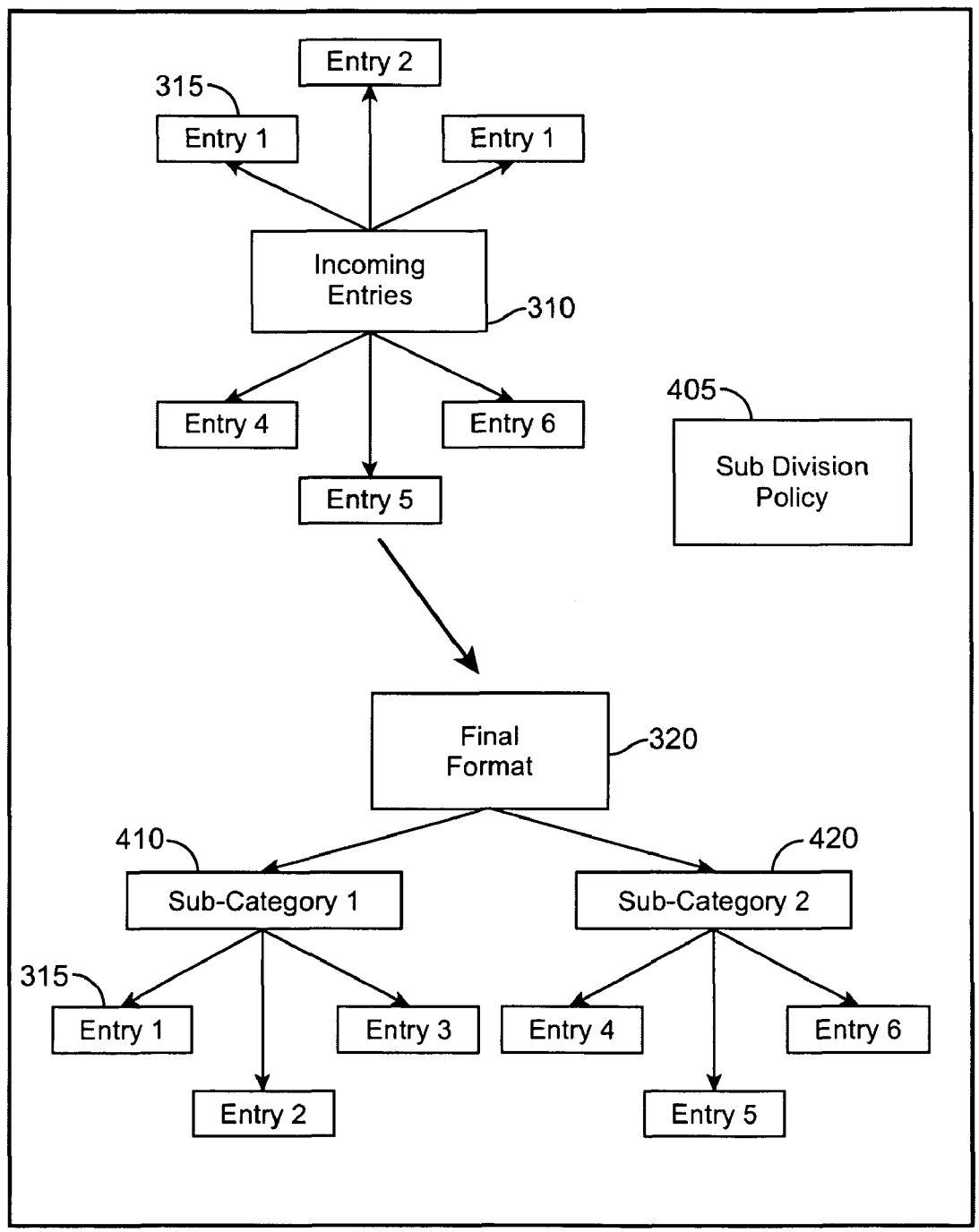
FIG. 4 illustrates a block diagram showing a sub-division policy according to an embodiment of the invention.

FIG. 4 illustrates a block diagram showing a sub-division policy 405 according to another embodiment of the invention. In this embodiment of the invention, the excess handler module divides the incoming entries 310 amongst the available spaces in the pattern 110. Each of these spaces acts like a new category, with all of the entries 315 that were allocated to it as its contents. The choice of which behavior used is configurable, as is the exact way in which it executes the chosen policy. For instance, single entries 315 can be discarded in preference to categories that will themselves have further entries 315 contained within them. Again, the system is designed to be extensible, so that new handling policies or executions can be added if needed. As illustrated in FIG. 4, the final format 320 includes a sub-category 1 410 and a sub-category 2 420, each having the sub-divided entries 315.

Figure 5:
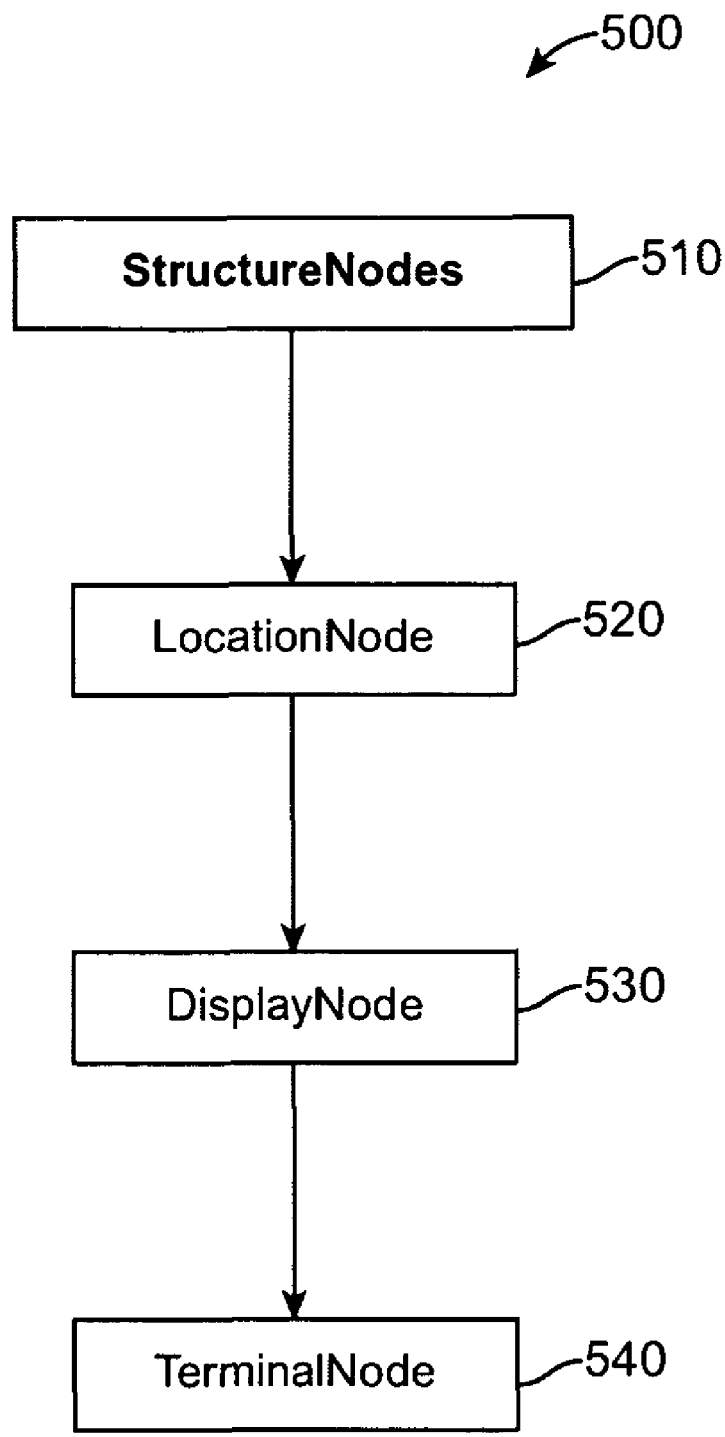
FIG. 5 illustrates a block diagram showing a node structure according to an embodiment of the invention.

FIG. 5 illustrates a block diagram showing a node structure 500, according to an embodiment of the invention. To represent the placement of actual in-world objects from the positioning data given by the patterns 110, a series of structure nodes 510 are used. Each of these structure nodes 510 corresponds to one of the offsets 115 from the patterns 110. In one embodiment of the invention, three different types of structure nodes 510 are used, each of which has slightly different properties and a different purpose. The three different types of structure nodes 510 are location node 520, display node 530, and terminal node 540. In one embodiment of the invention, the top level node is the location node 520. The display node 530 is a subset of the location node 520, and the terminal node 540 is in turn a subset of the display node 530.

In one embodiment of the invention, location nodes 520 are used to represent nodes that will not have any representation in the virtual world. The location nodes 520 positioning vectors are used to calculate the final position of the sub-nodes below them in the hierarchy. High level department categories in a catalog, or the central root node of the virtual store, are possible examples of this sort of node. These location nodes 520 nodes have unique identifiers, and offsets 115 to maintain their positioning information but not characteristic data beyond that.

Display nodes 530 are nodes that will have an actual representation in the virtual world. These could be display banners marking out a particular department or group of products, or it could be a table or shelf for actual products to be displayed on. They have a visual model associated with them, which tells the virtual world what object it should use to represent them. The visual model can also contain a mapping of any other information that might be needed to define the object. This mapping is designed to be extensible and might contain data that would be used by some virtual worlds but not others. It may also be used to maintain information that some items require, but others do not, such as a specific rotation or scaling to be used for a particular representation. This could allow for an in-world representation object to be used multiple times, with slightly different configurations for each usage.

Terminal nodes 540 are objects that will appear in-world and have actual interaction with in-world agents. Terminal nodes 540 cannot have any sub-nodes beneath them. Products in a store will be terminal nodes 540, with the interaction that allows purchasing or adding to the shopping cart associated with them.

For ease of understanding the embodiments of the invention, detailed examples are discussed herein. As described above, positions in a Pattern are described as vectors, <x, y, z> coordinates, from the center of the pattern 110. These coordinates are called offsets 115. The center of the pattern 110 is treated as being <0, 0, 0>. Each of the sub-divided areas has a center point that is described as a vector from that point. For example, a point at <0.5, 0.5, 0.5> is 0.5 units away along the x-axis, 0.5 units away along the y-axis and 0.5 units away along the z-axis. Each pattern 110 has an offset 115 to inform where the center of each of its sub-divisions is.

One of the simplest patterns 110 to describe is a square that is split up neatly into four smaller squares. This means that the pattern 110 has four sub-divisions, and that each of these sub-divisions is also a square. Since the sub-divisions are made by cutting up the square into four equal portions, each of them is half the length and width of the overall area. When discussing dividing up spaces, and the areas they are divided into, two terms are used. The overall area that is being split up is denoted as the Parent. Each of the smaller areas that are being portioned off is denoted as a Child of that Parent.

Figure 6:
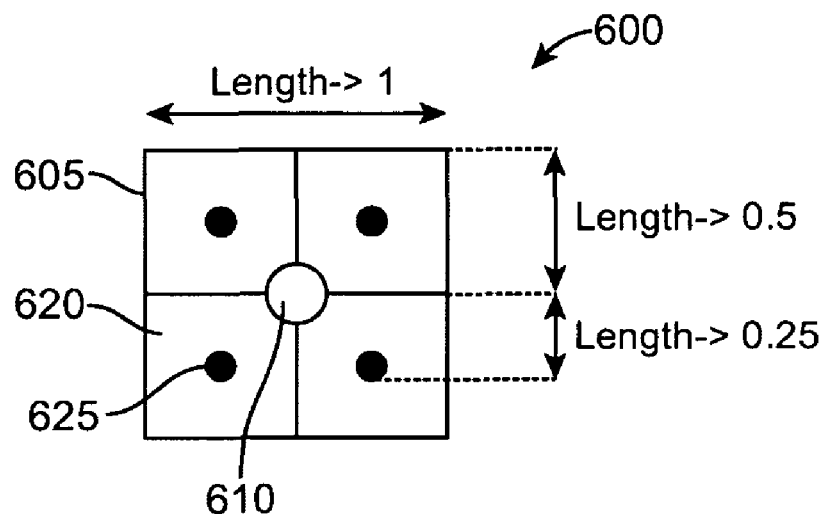
FIG. 6 illustrates an example of a square pattern according to an embodiment of the invention.

FIG. 6 illustrates an example of a square pattern 600, according to an embodiment of the invention. In this pattern 600, the empty circle in the middle shows the center 610 of the parent pattern 605. The smaller, black circles show the centers 625 of the Children patterns 620 that have been created. The lengths show how much of the space that the Parent pattern 605 started out with that has been portioned out to its Children patterns 620.

In one embodiment of the invention, the center 610 of the Parent pattern 605 in this example is the center of our frame of reference with the coordinates <0, 0, 0>. In this example, all of the coordinates will have their z-value set at zero. Looking at the Children patterns 620 that have been allocated (four in total), their coordinates can now be determined as follows. To finish describing this pattern 600, the transform 120 must be determined. In this example, the scaling factor can quite easily be determined by viewing FIG. 6. The largest distance for the Parent pattern 605 is '1'. For the Child patterns 620, its largest distance is '0.5' of the Parent pattern's length. Therefore, the scaling factor for the transform is '0.5'. Table I shows the coordinates for the Children patterns 620. Next the kind of shape the Parent pattern 605 needs to be determined. This is easily seen that the shape is a 'Square'. Also needed is what shapes the Children patterns 620 are. Again, the Children's shapes are also 'Square' shapes.

Figure 7:
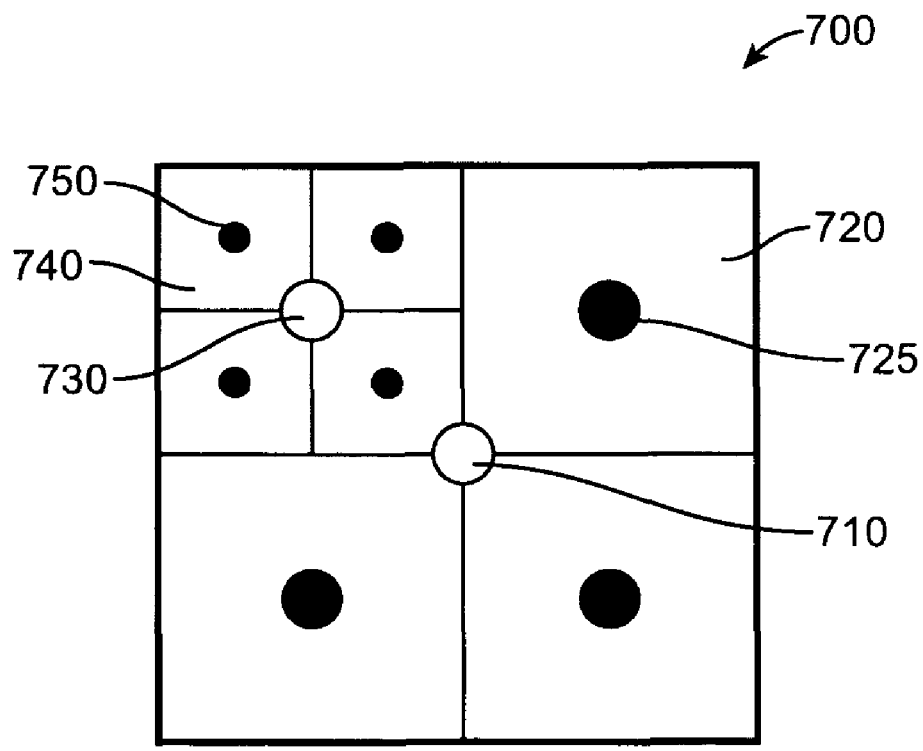
FIG. 7 illustrates an example of a mixed pattern according to an embodiment of the invention.

Since the Children patterns 620 have the same shape as their Parent pattern 605, the same pattern could be applied again to one of the Children patterns 620, where the Children pattern 620 then acts as a Parent of its own Children. Doing this, the space can be divided up into smaller and smaller squares, as long as it is desired to keep applying the pattern. FIG. 7 illustrates an example of a mixed pattern, according to an embodiment of the invention. As shown, pattern 700 includes Children patterns 720, including a center 725, which is offset from the Parent center 710. One of the Children 720 is sub-divided into Children 740 having centers 750 that are offset from the center 730.

TABLE I

| Parent | x_coordinate | y_coordinate | z_coordinate |
|---|---|---|---|
| Child 1 | 0.25 | 0.25 | 0 |
| Child 2 | 0.25 | −0.25 | 0 |
| Child 3 | −0.25 | −0.25 | 0 |
| Child 4 | −0.25 | 0.25 | 0 |

Figure 8:
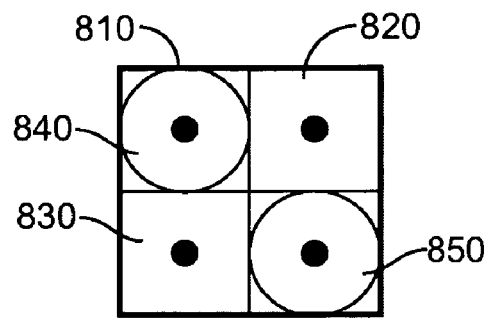
FIG. 8 illustrates another example of a mixed pattern according to an embodiment of the invention.

FIG. 8 illustrates another example of a mixed pattern, according to an embodiment of the invention. In this example, the Parent pattern 810 is sub-divided with Children 820 and 830 having a square shape and Children 840 and 850 including a circle shape. In one embodiment of the invention, a key is used to tell the different shapes apart. In this embodiment of the invention, the same pattern shown in FIG. 6 is divided up evenly into a mix of squares and circles. At this point, one key for the squares and one key for the circles are necessary. These keys are entered in the transform 120. As can be seen in FIG. 8, the size and positions of the children are the same as in FIG. 6, just with patterns 810 and 850 having a different shape. The keys maintain which shape is matched up to which offset that describes where a Child is positioned in the Parent pattern. Table II shows the keys and coordinates for the Child 1 820, Child 2 850, Child 3 830 and Child 4 840. Table III shows a transform for the pattern shown in FIG. 8. Looking up a key in the transform 120 contains the information of what shape is at that offset, and how much size it has available.

TABLE II

| Parent | key | x_coordinate | y_coordinate | z_coordinate |
|---|---|---|---|---|
| Child 1 | square | 0.25 | 0.25 | 0 |
| Child 2 | circle | 0.25 | −0.25 | 0 |
| Child 3 | square | −0.25 | −0.25 | 0 |
| Child 4 | circle | −0.25 | 0.25 | 0 |

TABLE III

| | shape | scaling factor | Key |
|---|---|---|---|
| Parent | square | — | — |
| Child 1 | square | 0.5 | Square |
| Child 2 | circle | 0.5 | Circle |
| Child 3 | square | 0.5 | Square |
| Child 4 | circle | 0.5 | Circle |

The information shown in table III is still quite simple, with the shapes being essentially the same size and their keys match up with their shapes. However, as long as each shape and placement has their keys, a wide range of layouts can be put together.

So far, the examples shown have pattern shapes that can be very easily defined. However, more complex shapes may be necessary. In one embodiment of the invention, in order to use complex shaped patterns, a series of parameters must be provided that will describe the complex pattern shape. Other shapes are used to determine whether they can fit inside other patterns, or whether a pattern can fit that shape into one of its own spaces. Each of these parameters has a name, and potentially a numerical value to go with it. For a square or circle, the parameter is just the name 'Square' or 'Circle' and a default value of '0', since specifying any accompanying value is unnecessary. These shapes are inherently symmetric, geometric shapes. If a rectangle pattern is needed, more information is needed as it could be very square, square, or it could be very elongated. In one embodiment of the invention, the type of rectangle is specified by using another parameter, one that describes the X-Y ratio of the length. These objects would have a description that went along the lines of: 'Rectangle': '0' and 'X_Y_Ratio':'5'.

Figure 9:
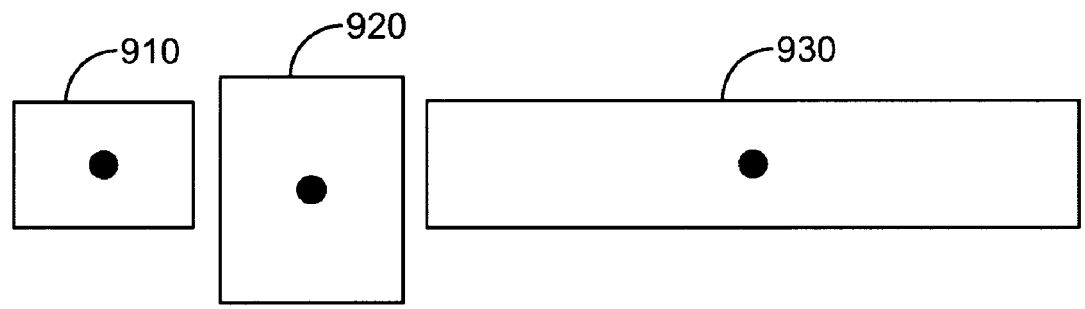
FIG. 9 illustrates examples of different rectangle patterns according to an embodiment of the invention.
Figure 10:
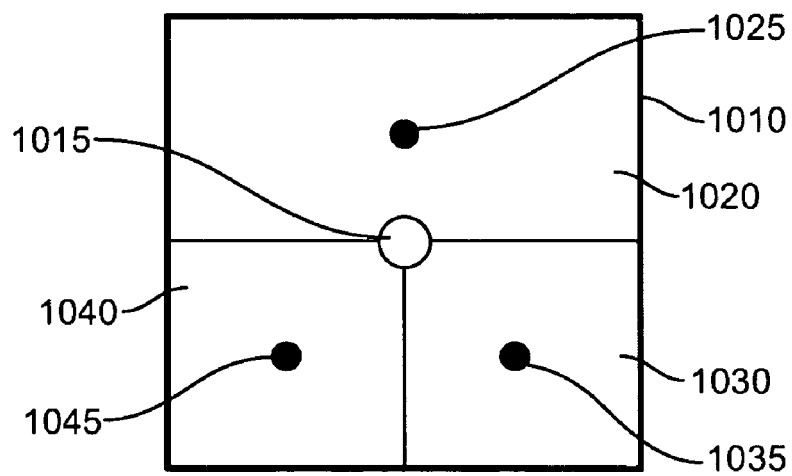
FIG. 10 illustrates an example of a mixed pattern with a rectangle sub-division according to an embodiment of the invention.

FIG. 9 illustrates rectangle pattern 910, 920 and 930. To illustrate how rectangles 910, 920 and 930 can be fitted into a pattern, FIG. 10 is used as an illustration. In this example, the standard square pattern 1010 having a center 1015 has been adapted to include a large rectangle 1020 taking up the place of the top two squares. The center of the rectangle 1025 has the offset <0, 0.25, 0> and the transform description of: 'Rectangle' '0' and 'X_Y_Ratio' '2'. The offsets and transform information for the lower squares 1030, having a center 1035, and 1040 having a center 1045, remain as previously described, as does the transform information for the larger square containing the smaller shapes.

It should be noted that the transform information presented as 'Square'—'0', or 'X_Y_Ratio'—'2', are just convenient descriptions and as long as the information is consistent, other representations can be used, such as 'Fred'—'0' and 'Barney'—'12358'. However, in one embodiment of the invention, parameters are used that describe the shapes in geometric terms, so it is easier to see what they are referring to, even though these parameters are not strictly tied to the shape itself.

Figure 11:
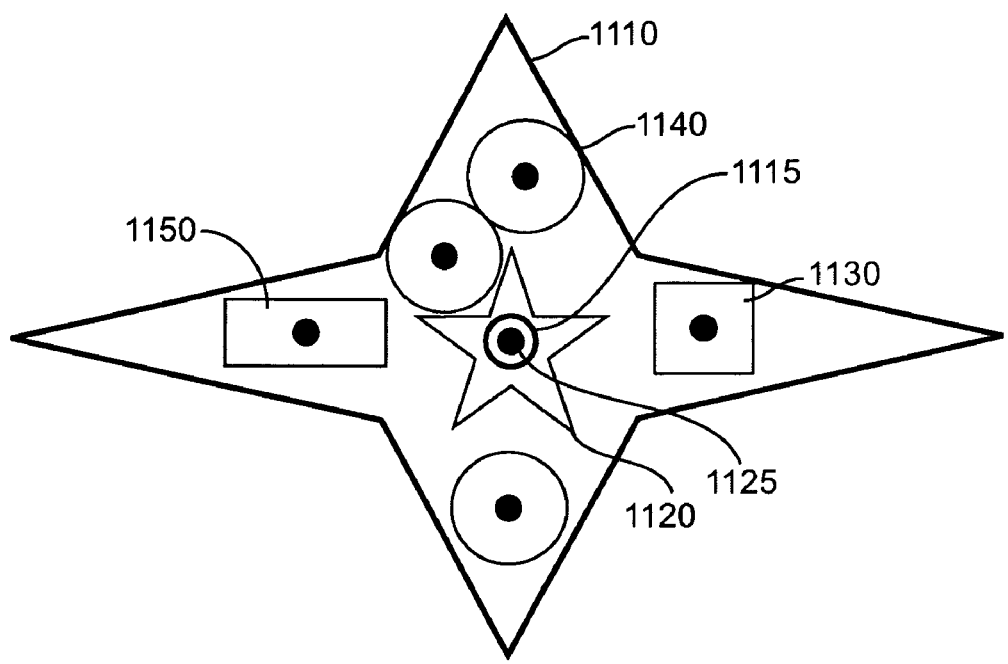
FIG. 11 illustrates an example of a complex mixed pattern according to an embodiment of the invention.

FIG. 11 illustrates another example of a complex shaped pattern 1110. The Parent pattern 1110 has a shape that is a four-pointed star with a center 1115, with one five-pointed star shape pattern 1120 as a Child with a center 1125, three circle shaped patterns 1140, a rectangle shape pattern 1150 and a square shape pattern 1130. While this example pattern and sub-divisions seems much more complicated, it still follows exactly the same form as the previously presented patterns. Each of the Children has an offset, informing where it is in regard to the center 1115 of the Parent star pattern 1110. The Children also each have a set of transform data that including parameters of what shape they are and what size they are as compared to the parent pattern 1110. There is no need for the layout to be symmetrical, or even particularly ordered. As long as the Children remain within the bounds of the parent, whatever shape that may be, they can be in whatever position or shape the user wishes.

Figure 12:
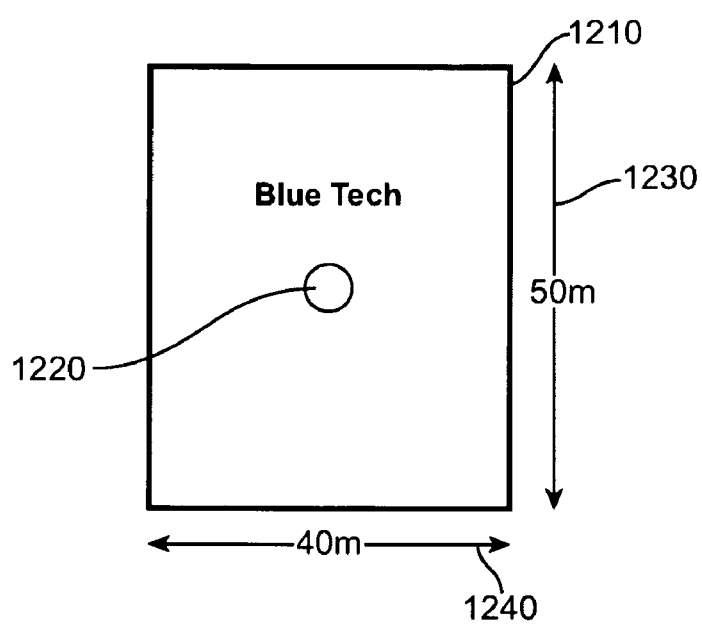
FIG. 12 illustrates an example of a virtual world store parent pattern according to an embodiment of the invention.

FIG. 12 illustrates a Parent pattern of an example virtual store. In this example virtual store, the virtual store will have a small kiosk area in the front with a customer help-desk and some shelving displays. The rest of the space of the virtual store is divided into three sections. The first section will be a central aisle with some tables to put displays of promotional products on. The other two will be aisles of shelving that can contain the bulk of the products in the store.

To begin with, knowing the amount of space allowed to build the virtualstore in is needed. It is also necessary to know what shape of area is available to fit the virtual store into and the size of the virtual store as well to have an idea of how many objects can fit in. In this example, the virtual store is named 'BlueTech' and will have a reasonably sized plot of virtual land in the shape of a rectangle Parent pattern 1210 with a center 1220 with a size of 40 m (1240)×50 m (1230). From this information, a pattern is needed to split the area up. Rather than place everything all at once, the sub-divisions are looked at one level of detail at a time. The store is sub-divided into the kiosk area, the central aisle and the two side aisles. This is denoted as the root pattern since it is the basis of the layout that is being designed. The root pattern has a transform, including the information of how many Children it can have, what shape they can be and what shape the Parent is itself.

Figure 13:
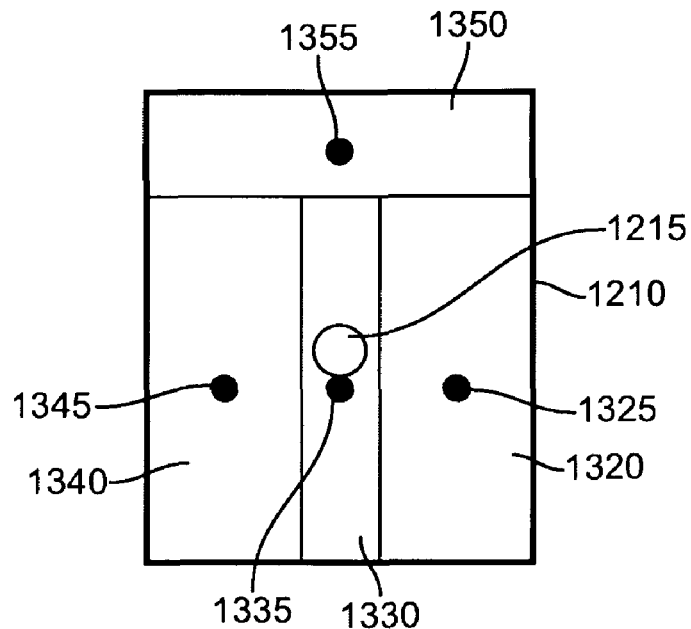
FIG. 13 illustrates sub-division patterns for the example illustrated in FIG. 12 according to an embodiment of the invention.

FIG. 13 illustrates the root pattern, including kiosk 1350 having a center 1355, central aisle 1330 having a center 1335, left aisle 1340 having a center 1345 and right aisle 1320 having a center 1325. For each of the four Children, it is known that the pattern has an offset to dictate its position and a key to inform what transform information should be looked up to find out about that Child. Working out the precise offsets requires some basic geometry. In this example, the kiosk offset is: <0, 0.4, 0>—> Key: Kiosk; the central offset is: <0, 0.1, 0>–> Key: Center; and the aisle offsets are: <0.3125, –0.1, 0>–> Key: Aisle and <–0.3125, –0.1, 0>–> Key: Aisle.

The transform includes the information about the shape of the Parent, and about each of the Children. For each key, the scaling factor informs of their size, and the descriptions to inform of their shape. Note that we only need one entry for both of the aisles. Aisle 1340 and aisle 1320 have the same key, they behave in the same way, and the information in the transform is independent of what their exact position is. For this example, the transform information is determined as follows:

| Parent: | |
|---|---|
| Description | |
| Rectangle | '0' |
| X_Y_Ratio | '0.8' |
| Children: | |
| Key: Kiosk | |
| Scaling Factor | '0.8' |

[For the Kiosk, the longest distance is the width of the Kiosk. Looking at the shape it can be seen that this is the same as the width of the parent rectangle 1210, and is 0.8–50/40–80% of the length.]

| Description | |
|---|---|
| Rectangle | '0' |
| X_Y_Ratio | '4' |

[The kiosk's width is 40 m, the length is 10 m, so –40/10–4.]

Key: Center
  Scaling Factor '0.8'
[The longest distance for the center is the length, which is 40 m. It is the 50 m length of the whole store, less the 10 m of the kiosk.]

| Description | |
|---|---|
| Rectangle | '0' |
| X_Y_Ratio | '0.25' |

[The size of the Center aisle is 10 m by 40 m.]
Key: Aisle
  Scaling Factor '0.8'
[Same length and scaling factor as the central aisle.]

| Description | |
|---|---|
| Rectangle | '0' |
| X_Y_Ratio | '0.375' |

[The size of the side aisles is 15 m by 40 m.]

It should be noted that although the ratios and scaling factors have been determined based on the actual store size, they will hold true for any shape with the same scale as the Parent rectangle, whether it be 40 m×50 m, 80 m×100 m or 8 km by 10 km. In this embodiment, everything is ratio-driven, and therefore is very flexible.

Having decided on an overall layout, it is now needed to decide how to lay out each of the individual areas. For this, it is needed to describe the patterns to use, and their transforms. In this example, first the center aisle 1330 will be discussed, followed by a look at the side aisles 1320 and 1340, which will show the similarities and differences between these two patterns. Finally, the kiosk 1350 at the head of the store will be discussed.

Figure 14:
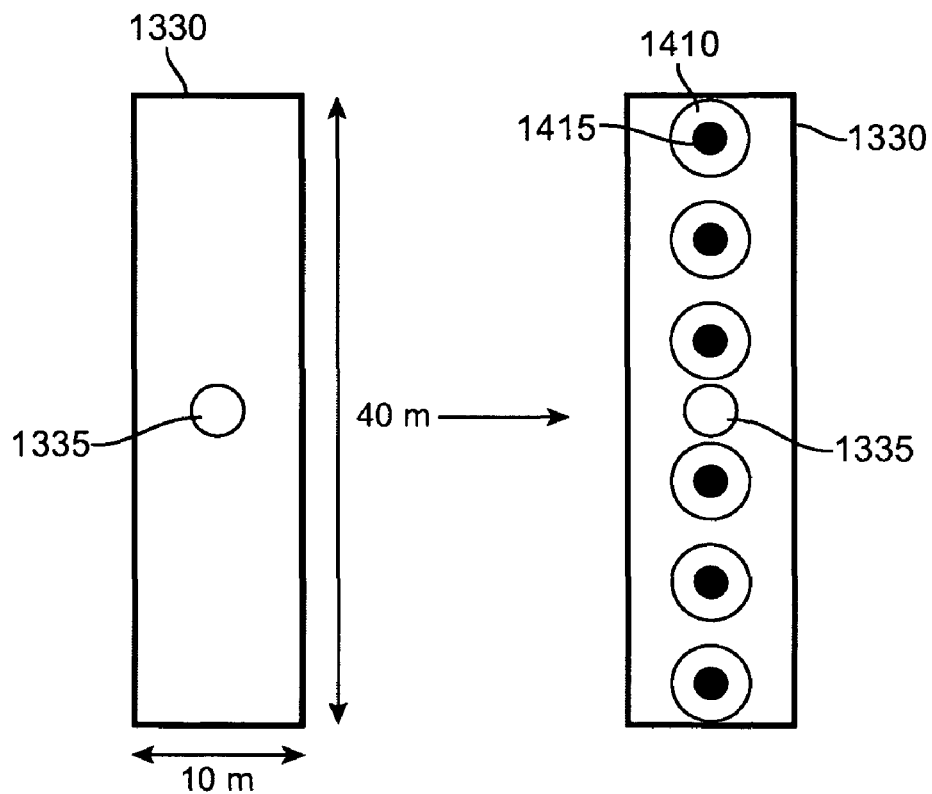
FIG. 14 illustrates a center aisle pattern including tables for the example illustrated in FIG. 12 according to an embodiment of the invention.

FIG. 14 illustrates the center aisle 1330 in this example according to one embodiment. The center aisle 1330 is addressed as a Parent in its own right. In this example, a series of large tables 1410 each having a center 1415 are positioned down the center aisle 1330 and can be used to display promotional offers for the virtual store. In this example there are six tables spaced out down the length of the center aisle 1330. The offset information is as follows:

| Tables –> | Key: Table | |
|---|---|---|
| [1] <0, 0.15, 0> | [2] <0, 0.3, 0> | [3] <0, 0.45, 0> |
| [4] <0 –0.15, 0> | [5] <0, –0.3, 0> | [6] <0, –0.45, 0> |

Since all of the Children for this pattern can use the same key, the transform information for the pattern is quite simple.

| Parent: | |
|---|---|
| Description | |
| Rectangle | '0' |
| X_Y_Ratio | '0.25' |
| Children: | |
| Key: Table | |
| Scaling Factor | '0.1' |

[Each of the tables will be large, 4 m across, with room for a main display in the center and a number of other items arranged around it.]

| Description | |
|---|---|
| Circle | '0' |

Figure 15:
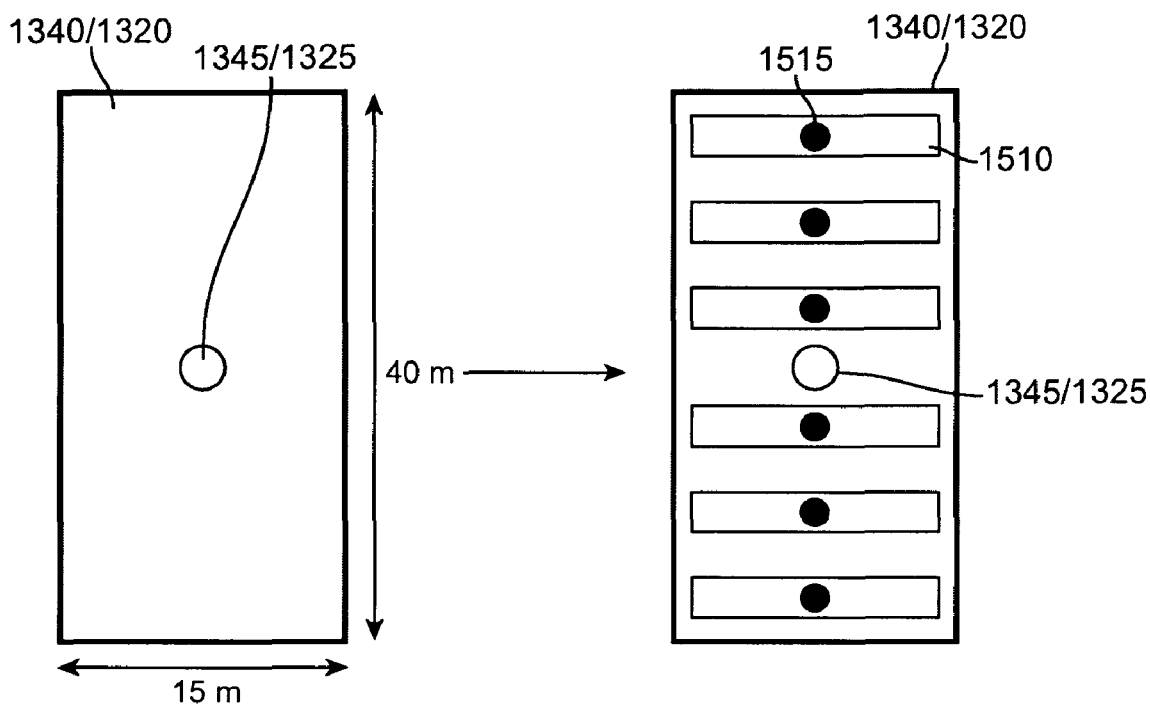
FIG. 15 illustrates an aisle pattern including shelves for the example illustrated in FIG. 12 according to an embodiment of the invention.

FIG. 15 illustrates the side aisles 1320 and 1340. In this example, a series of shelves 1510 (having centers 1515) running down the length of the aisle 1340/1320 is desired. Since the spacing is the same as for tables 1410 (see FIG. 14) in the center aisle 1330, the shelves 1510 have the same offset data:

| Shelves –> | Key: Aisle | |
|---|---|---|
| [1] <0, 0.15, 0> | [2] <0, 0.3, 0> | [3] <0, 0.45, 0> |
| [4] <0 –0.15, 0> | [5] <0, –0.3, 0> | [6] <0, –0.45, 0> |

For the transform associated with the side aisle pattern, the differences can be seen that distinguish the two. The shape of the side aisle's parent (1340/1320) is slightly different and the children (1510) that it contains are entirely different.

| Parent: | |
|---|---|
| Description | |
| Rectangle | '0' |
| X_Y_Ratio | '0.375' |

|  |  |  |
|---|---|---|
| Children: |  |  |
| Key: Shelf |  |  |
| Scaling Factor | '0.35' |  |

[In this example, the shelves 1510 are set to be 14 m long, leaving 0.5 m clear on either side, results in 14 m/40 m=0.35.]

|  |  |
|---|---|
| Description |  |
| Rectangle | '0' |
| X_Y_Ratio | '4' |

[In this example, the shelves 1510 are set to be 3.5 m wide, slightly less than the tables 1410, results in 14 m/3.5 m=4.]

Figure 16:
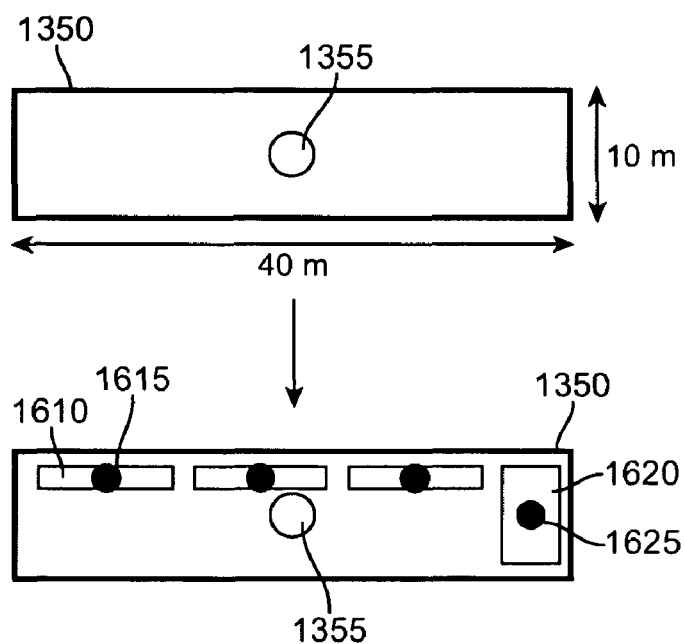
FIG. 16 illustrates a kiosk pattern including shelves and a desk for the example illustrated in FIG. 12 according to an embodiment of the invention.

FIG. 16 illustrates the kiosk pattern 1350. In this example, we are less concerned with placing the display shelves 1610 in this area than we are with the free space that will be left there. As well as simply displaying the products in the area, the kiosk section 1350 is meant to give customers somewhere to mill around, to talk to any sales support staff that are available, and to make an area for general information about the store. It is important to note because it highlights that patterns can take into account the design and purpose of the store as a whole, as well as just placing the products within it. In this example, a desk 1620 having a center 1625 and three shelves 1610 having a center 1615 have offsets as follows:

|  | Desk Offset -> | Key: Desk |  |
|---|---|---|---|
| [1] <0.45, 0, 0> |  |  |  |
|  | Shelf Offsets -> | Key: Shelf |  |
| [1] <−0.35, 0.125, 0> | [2] <−0.05, 0.125, 0> | [3] <0.25, 0.125, 0> |  |

[In this example, the shelves are set to be 10 m long and 2 m wide. Although the key used here is the same as for a previous pattern, the key is used internally by the pattern to distinguish between its Children and does not need to be globally unique.]

It is known that the Parent entry will match up to the Child entry for the overall store pattern, and that the shelves will have their own entry. The transform information is as follows:

|  |  |  |
|---|---|---|
| Parent: |  |  |
| Description |  |  |
| Rectangle | '0' |  |
| X_Y_Ratio | '4' |  |
| Children: |  |  |
| Key: Desk |  |  |
| Scaling Factor | '0.2' |  |
| Description |  |  |
| Rectangle | '0' |  |
| X_Y_Ratio | '0.5' |  |

[In this example, the desk is set to be 4 m wide and 8 m long.]

|  |  |  |
|---|---|---|
| Key: Shelf |  |  |
| Scaling Factor | '0.25' |  |
| Description |  |  |
| Rectangle | '0' |  |
| X_Y_Ratio | '5' |  |

Figure 17:
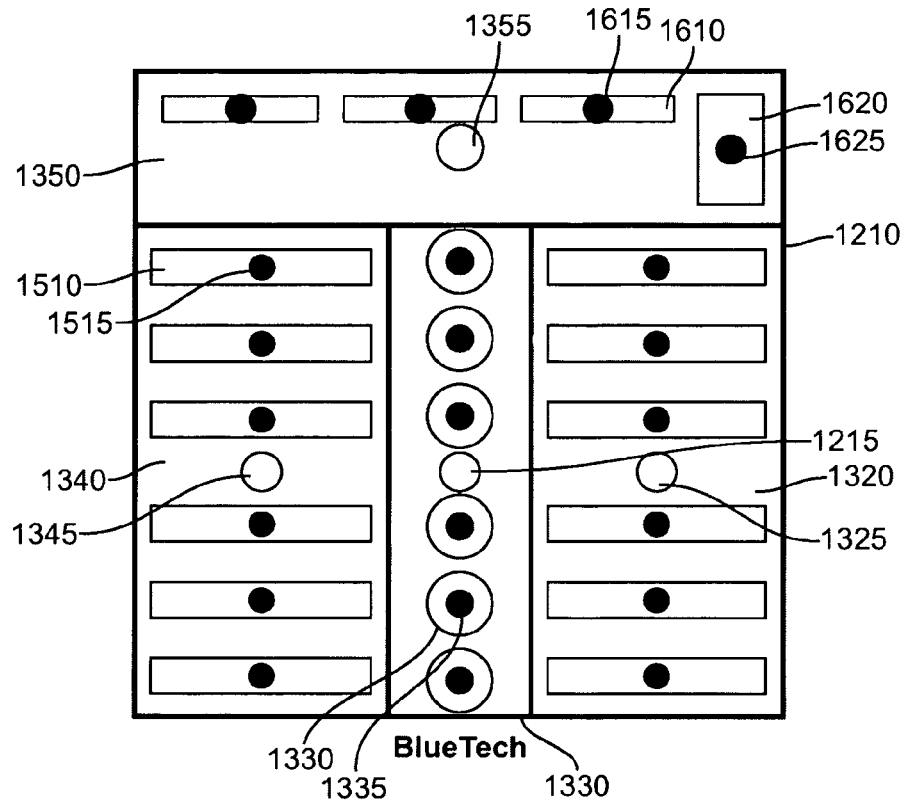
FIG. 17 illustrates a sub-divided pattern of a virtual store according to an embodiment of the invention.

FIG. 17 illustrates the example virtual store Parent pattern 1210 and its Children patterns combined. At this point it may seem that defining these layouts as Patterns is effectively just the same as designing the shop layout outright. In one embodiment of the invention, an important thing to note is that having designed these layouts once, they can now be used as many times as desired. If the virtual store was much larger, dozens of instances of aisle patterns 1320/1340/1330 could be used to generate row after row of products. The patterns designed can be interspersed with other designs to create variations of the same shop. For example, a center aisle with smaller but more numerous table displays can be used or one of the side aisles 1340/1320 could be swapped for an open-plan layout of chairs and tables to give a coffee-shop style meeting place for customers to relax in.

Turning to adding the products to be displayed in the virtual store, instead of splitting up the area into departments or displays, a display is split up into a series of product locations within that display.

In one embodiment of the invention, the patterns that are intended to be used to layout products are denoted as terminal patterns. These patterns are meant to hold actual virtual world items at each of their offsets, not further Children for other patterns to be applied to. These patterns also have a default iconic, a virtual world representation that is intended to be used with them. This can be replaced with something else in the final store build if the user wants, but they are designed with a particular size and shape of display in mind.

For the terminal patterns, the products are to appear on actual virtual world shelves and tables. If their positions are re-scaled based on the exact size they are being fit into, the products may end up floating out of place or even intersecting with the displays. In one embodiment of the invention, instead of giving the offsets as actual distances that are desired for the products to appear from the center of their parent display, the system 2000 (see FIG. 20) takes this into account when it encounters a terminal pattern and doesn't attempt to rescale them as it does with other patterns.

Figure 18:
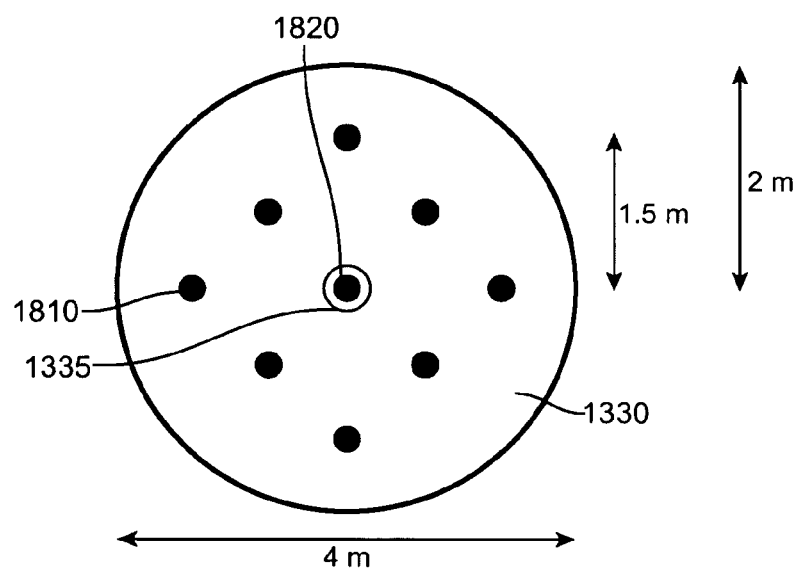
FIG. 18 illustrates a table pattern including products for a virtual store according to an embodiment of the invention.

FIG. 18 illustrates a table 1330 including terminal patterns 1810 and 1820 according to an embodiment of the invention. In this example, it is desired to have a single central product 1820, surrounded by a series of other products 1810. In this example, simple z-coordinates are used in the pattern. In this example, it is desired to raise up the products, with the central product 1820 slightly higher than the rest. In this example, the table is set to be 0.75 m high, with the central area being a full 1 m in height. The offsets are as follows:

|  |  |
|---|---|
| Center Offset -> | Key: Center |
| <0, 0, 1> |  |

[This results with the central product 1820 in the middle of the table, elevated above the rest of the table surface.]

| | Surrounding Offsets -> | | Key: Rim |
|---|---|---|---|
| [1] <0, 1.5, 0.75> | [2] <0.75, 0.75, 0.75> | | [3] <1.5, 0, 0.75> |
| [4] <0.75, −0.75, 0.75> | [5] <−1.5, 0, 0.75> | | [6] <−0.75, −0.75, 0.75> |
| [7] <−1.5, 0, 0.75> | [8] <−0.75, 0.75, 0.75> | | |

In one embodiment of the invention, the transform information for a terminal pattern is slightly unusual, in that it is passing down to products. The terminal pattern will not have any Children of its own, so the information in that section simply specifies that it is a terminal pattern. Although scaling factors are listed, these are to give an idea of that space that will be available to a potential product rather than to be used by a Child pattern. The transform information is as follows:

```
Parent:
    Description
        Circle                    '0'
Children:
    Key: Center
        Scaling Factor            '0.1'
        Description
            Terminal              '0'
    Key: Rim
        Scaling Factor            '0.05'
        Description
            Terminal              '0'
```

In one embodiment of the invention, the patterns desired can be manually constructed or a management/user interface can be used to choose patterns and allocate products and/or departments as desired. In one embodiment of the invention, the patterns and products have already been created and are selected using the management/user interface. In one embodiment of the invention, the allocation process is automated and uses a template system that is part of system 2000 (see FIG. 20).

Figure 19:
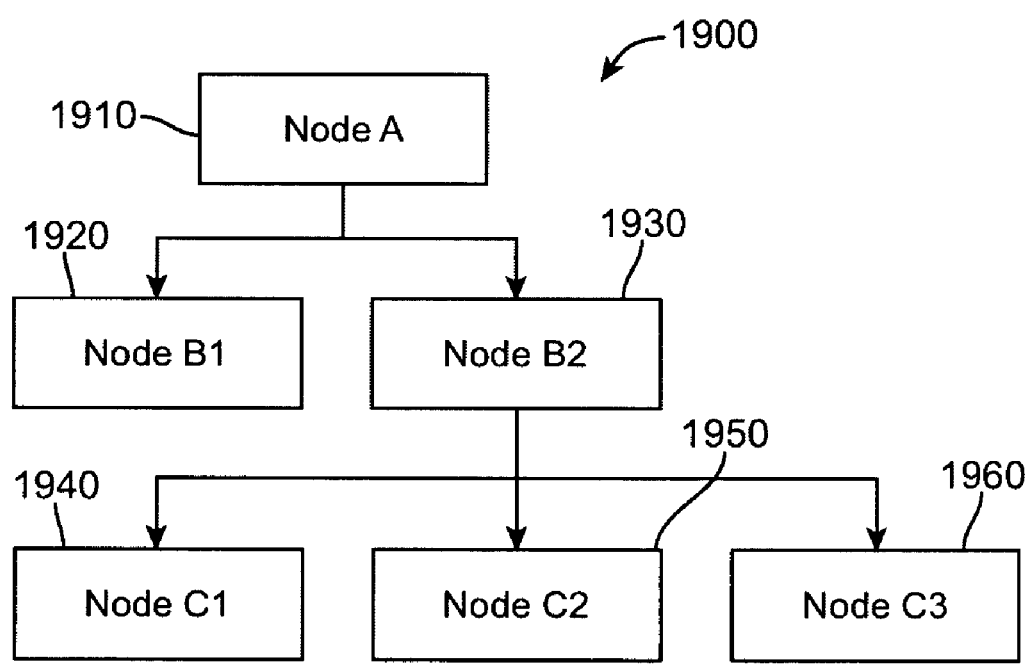
FIG. 19 illustrates a template node hierarchy according to an embodiment of the invention.

In one embodiment of the invention, the template system acts to analyze a representation of the product data coming in and chooses from a list of patterns as to which to apply and where. A single template system is made up of a number of template nodes that are connected together in a tree-like structure. FIG. 19 illustrates an example of a template node hierarchy 1900. Each node has a set of patterns that it can output, a series of tests/criteria to run on the catalog data coming in, to decide how to behave, and set of Child template nodes that it may transition to after giving out a pattern. As illustrated, Parent node A 1910 has Child nodes node B1 1920 and B2 1930. Child node B2 1930 is a Parent node to Child nodes node C1 1940, node C2 1950 and node C3 1960.

In one embodiment of the invention, when a template node is called on to select a pattern, it runs its test/criteria on the catalog data given to it. As a result of the tests/criteria, it results with a key value. This key value determines which of its selection of patterns it outputs. If the key value also has a Child template node associated with it, then the template node will give a reference to that Child back along with the pattern it outputs. Essentially, the template nodes function as a set of states in a finite state machine, with the catalog data comprising the inputs, the patterns being the outputs and the transition to Child nodes representing the change of state.

The tests that are run on the incoming data are defined within each individual template node, along with any parameters that are needed for them. Once a test has been defined, any template node can make use of it. Each test gives a pass or fail result, a true or false value for meeting the test. In one embodiment of the invention, each key in a template node is uniquely defined by a particular set of boolean test values. In one embodiment of the invention, a key is defined by the set of tests that it passes, and no key should pass all of the tests that another key does, even if it also has further defining passes.

The template system runs through a set of catalog data, starting with the top-level categories and assigns patterns to them. It then moves on to their sub-categories, and outputs patterns to them and recourses on down in this fashion until it has output patterns to all of the categories. Each category will be laid out according to a pattern and every product will have a location in a pattern to be allocated to. The tests are applied to the category in the catalog being examined at the time.

In one embodiment of the invention, test examples are as follows. Tests might look at criteria such as: how many sub-categories a given product category contains; whether a category contains only products, and no further sub-categories; whether a category is the root category of a store, etc.

A simple template could follow the format below. It would distinguish between the root-level categories of a store and any sub-categories. To the root level, it outputs a pattern called "p_square_many" that divides a starting square space into sixteen smaller squares of equal size. To any levels below that, it outputs a pattern called "p_square_square" that divides a starting square into four squares of equal size. To determine the keys for this, the template node has two tests. One test determines whether or not the category being analyzed is the root level, the other determines whether or not a category is a sub-category of another category.

```
Template Node:           m_simple
    Tests:
                         isRoot
                         isSub
    Test Mappings:
        Key ->           root
                         Tests
                         isRoot
        Key ->           sub
                         Tests
                         isSub
    Patterns
        Key ->           root
                         p_square_many
        Key ->           sub
                         p_square_square
```

Since this is a simple example, the template node has no Children. It simply outputs its set of patterns to all of the possible catalog data. Since it is known that the "p_square_square" pattern can only handle four sub-categories or products at each level, it can easily be imagined that it cannot fit very well with the catalog data.

In another example, the next template set consists of two different template nodes. The first will handle the root level and all of the sub-categories down until those categories containing products are reached. The second template node will look at the different number of products that there might be in any given category and give out one of a set of patterns to fit. The patterns already created are used, as well as "p_terminal_few", "p_terminal_many" and "p_terminal_lots" to serve as the terminal patterns for the second node. Another test, one to tell if the category below the current one contains only products is added, 'isPreTerminal'. This is done because the tests have access to the full range of catalog data when they execute, even if normally the information for the level currently at is used only.

```
Template Node:        m_advanced_root
    Tests:
                      isRoot
                      isSub
                      isPreTerm
    Test Mappings:
        Key ->        root
                      Tests
                      isRoot
        Key ->        sub
                      Tests
                      isSub
        Key ->        switch
                      Tests
                      isPreTerm
    Patterns
        Key ->        root
                      p_square_many
        Key ->        sub
                      p_square_square
        Key ->        switch
                      p_square_square
    Children
        Key ->        switch
                      m_advanced_terminals
```

In this template node example, the 'sub' and 'switch' keys both output the same pattern. However, the 'switch' key causes the template to move to the next template node. This is necessary because we want the behavior of outputting patterns to be consistent and the state can be changed in response to an input asking for a pattern. In the case of the 'switch' key, the pattern will be output and a reference to the Child template node returned as well. For the new test, parameters are introduced. The tests will be determining how many products there are in the category they are examining. Each test will be of the same general format but will be checking for different values to match their keys.

```
Template Node:                  m_advanced_terminals
    Tests:
        prodNum - few
            Parameters
                minimum number    0
                maximum number    4
        prodNum - many
            Parameters
                minimum number    4
                maximum number    12
        prodNum - lots
            Parameters
                minimum number    12
                maximum number    20
```

[Assumes that the numbers are exclusive on the lower bound and inclusive on the upper.]

```
    Test Mappings:
        Key ->        few
                      Tests
                      prodNum - few
        Key ->        many
```

```
                      Tests
                      prodNum - many
        Key ->        lots
                      Tests
                      prodNum - lots
    Pattern
        Key ->        few
                      p_terminal_few
        Key ->        many
                      p_terminal_many
        Key ->        lots
                      p_terminal_ots
```

In one embodiment of the invention, these are defined as being part of the same template, but once a template node has been defined, it can be used by any number of other templates. When the template is used, the nodes are all assembled, from the root node of the template down through its Children and all of theirs in turn. The "m_advanced_terminals" template node is a fairly general style that could be used by any number of templates. This means that while defining a really comprehensive set of tests and patterns for a template node may take a while, it can be re-used very flexibly afterwards.

Figure 20:
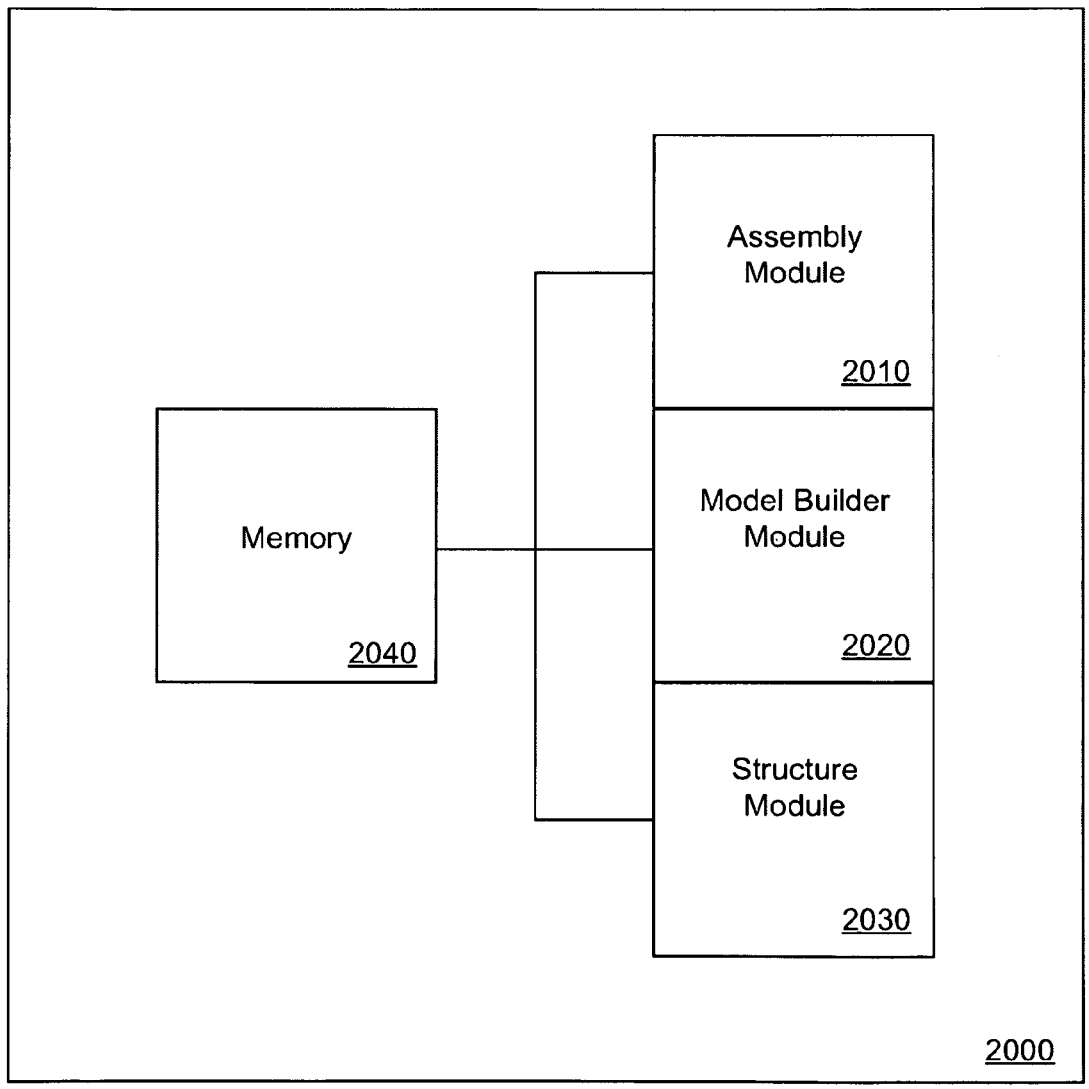
FIG. 20 illustrates an apparatus according to an embodiment of the invention.

FIG. 20 illustrates a block diagram of a virtual world apparatus 2000. In one embodiment of the invention, virtual world apparatus 2000 includes an assembly module 2010, a model builder module 2020, a structure module 2030 and a memory 2040. In one embodiment of the invention, the assembly module 2010 is configured to create a three-dimensional pattern for a virtual world environment, such as a virtual store, to sub-divide the pattern into a plurality of sub-divisions, each having a vector relative to a center of the pattern, and create a transform including a description of the pattern and shape information for each sub-division. In one embodiment of the invention, the model builder module 2020 is configured to build a portion of a virtual world environment by positioning the pattern and sub-divisions and store the transform for reusing the pattern and sub-divisions for another virtual world environment in the memory 2030.

Figure 21:
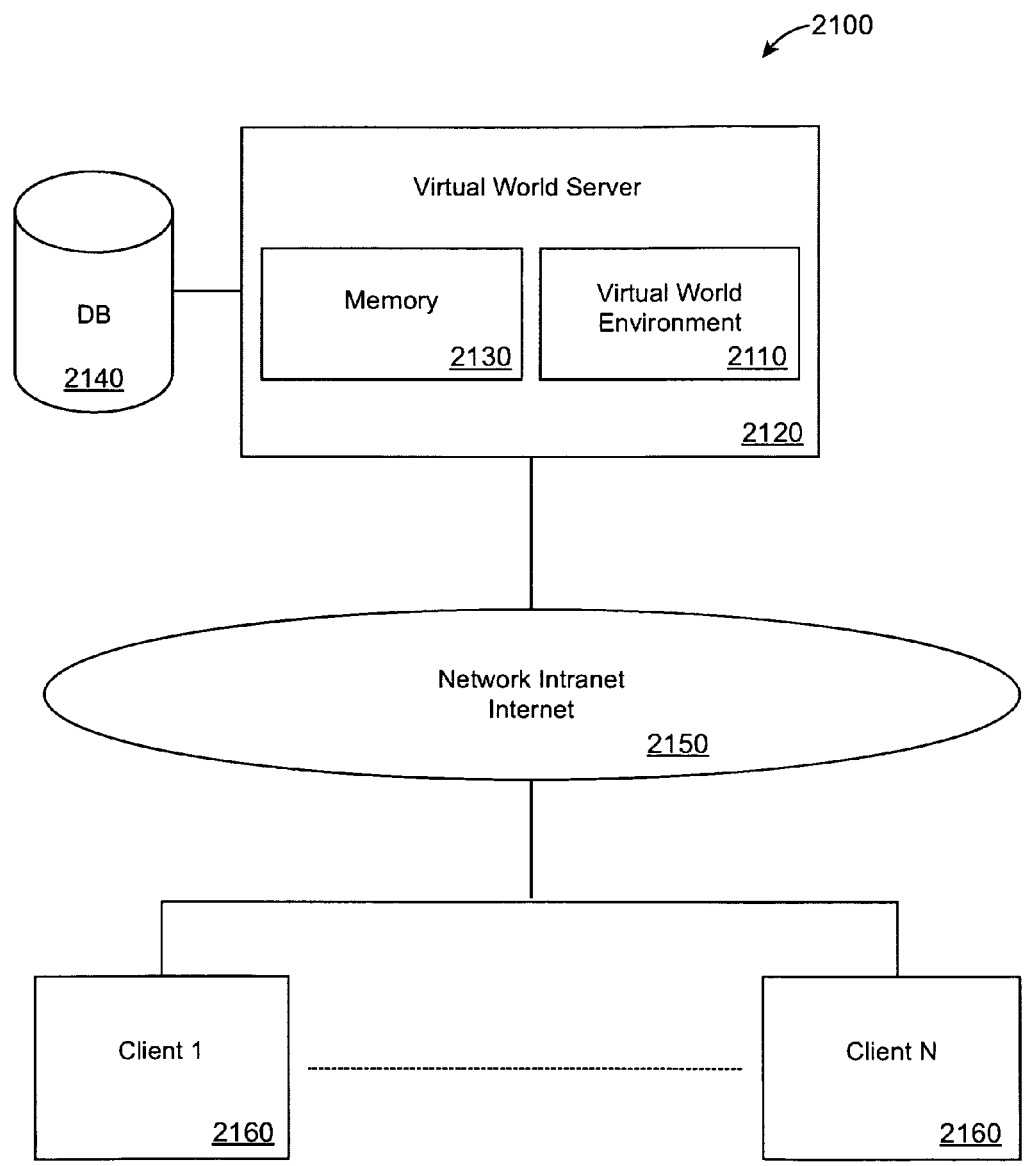
FIG. 21 illustrates a system according to an embodiment of the invention.

FIG. 21 illustrates a virtual world environment system 2100. System 2100 includes a virtual world environment 2110 running on a virtual world server 2120 having a memory 2130 and connected with a database 2140, a network/Intranet/Internet 2150, clients 1-N 2160. In one embodiment, a user using a client 2160, can create virtual world environment information locally on client 2160 or on the virtual world server 2120. In one embodiment, product information is uploaded from a client 2160 to the virtual world server 2120.

Figure 22:
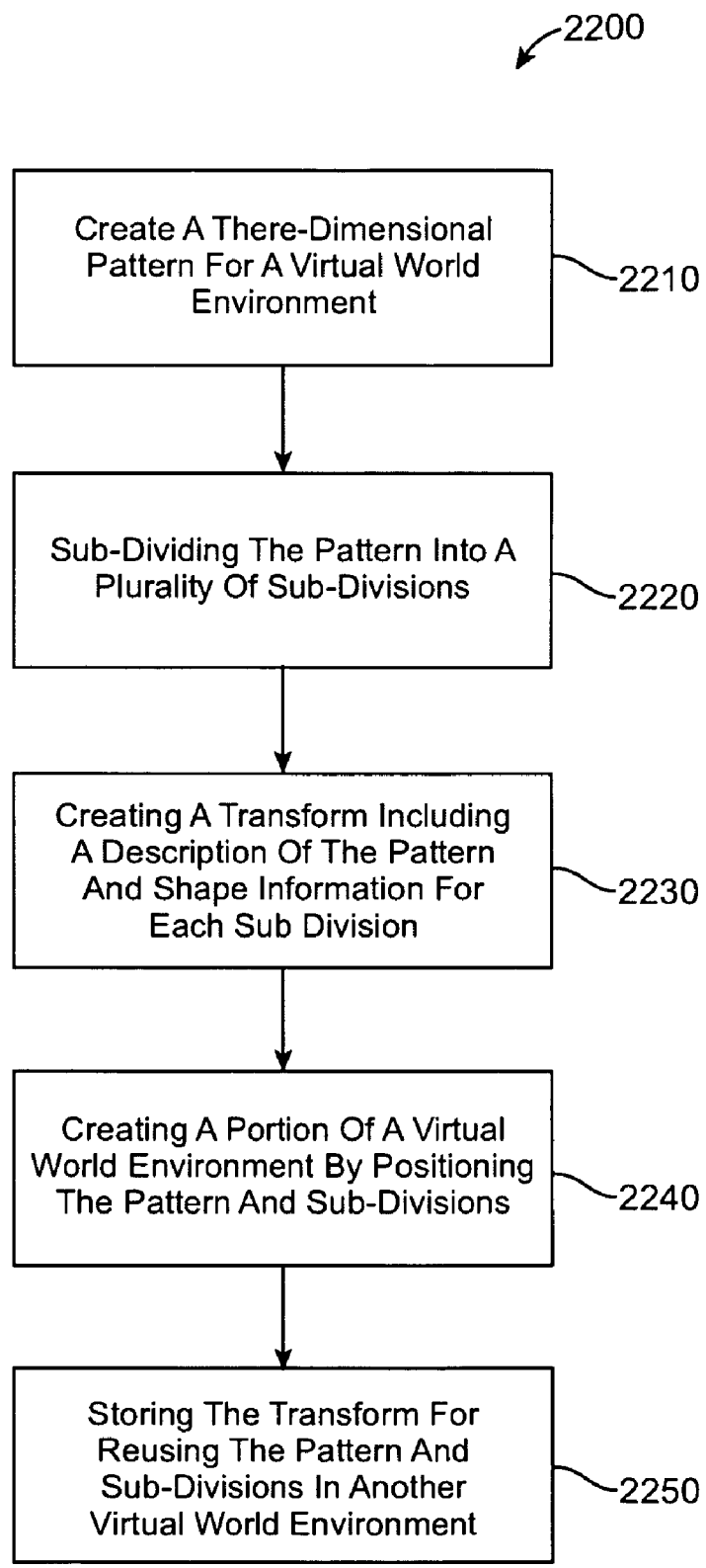
FIG. 22 illustrates a block diagram of a process according to an embodiment of the invention.

FIG. 22 illustrates a block diagram of process 2200, which provides three-dimensional virtual world pattern positioning according to one embodiment. In block 2210, a three-dimensional pattern is created for a virtual world environment. In block 2220, the pattern is sub-divided into a plurality of sub-divisions each having a vector relative to a center of the pattern. In block 2230, a transform is created including a description of the pattern and shape information for each sub-division. In block 2240, a portion of a virtual world environment is created by positioning the pattern and sub-divisions. In block 2250, the transform is stored in a memory for reusing the pattern and sub-divisions in another virtual world environment.

In one embodiment of the invention, the shape information includes type of shape and a scaling factor based on a size of each sub-division. In another embodiment of the invention, coordinates of the vector are offset positions relative to the center of the pattern to a center of the sub-divisions. In one embodiment of the invention, commerce information regarding products, services, etc., are received, a node hierarchy is built with the commerce information, structure information of the commerce information is determined, the structure information is transferred to template node elements, and the template node elements are used to determine a pattern to use for creating a level of a virtual world by comparing the template node elements with the stored transform information.

In one embodiment of the invention, the node hierarchy includes a location node including a positioning vector used to determine position of a display node and a terminal node, the display node includes an actual representation of a virtual world element, and the terminal node is an object to appear in the virtual world for interaction with visitors. In one embodiment of the invention, the object is a store product. In another embodiment of the invention, the sub-divisions can be further sub-divided.

It should be noted that while a virtual store example is discussed, the embodiments of the invention can be used to lay out other ordered data sets. For example, an organizational chart describing business processes and job roles instead of products could be used to generate virtual office space automatically. This could allow for redesign of office space to reflect organizational changes or to recreate different layouts of a business, each suited to supporting an activity profile. The layout of workers and resources most useful during a technical development or customer profiling phase might not match what was most useful to the business when packaging and shipping a product build or rolling out a marketing campaign on behalf of a client.

In other embodiments of the invention, even while remaining in the retail area, there are other applications of the system 2000. Rather than using it to lay out a working store in a virtual world, it might be used to test and visualize builds for stores to be built in real-life. In one embodiment of the invention, the system 2000 can be used to build a layout for stores to visualize and manage their warehousing and supply chain. In this model interactions would be internal stock transfers and requisitions rather than purchases by external customers.

It should be noted that the nodes created by the management interface contain more information in certain areas than do the generic nodes used by the automated build system 2000. In one embodiment of the invention, the two are merged to create a data node implementation that stores all necessary information. In this embodiment of the invention, a build can be created using the automated generation system 2000 to be viewed and modified by the management interface. If preserving the generic nodes without the build-specific information that UINodes contain was to be more useful, for re-use of the generic node tree for multiple builds, for instance, then some modifications to the structure node's stored data could be made instead. This allows the management interface to interact with the stored structure node data for visualization and modification.

Given the inter-conversion between data and structure nodes, in one embodiment of the invention, all of the nodes are instances of a single master node class. The specific node type is kept as a variable referred to in the node. While separating out the distinct node types into different classes is generally good practice, in one embodiment of the invention the system 2000 changes node type dynamically by making a single, unified class for a more efficient solution. In one embodiment of the invention, the master node class stores all of the necessary fields and methods and only uses them as appropriate to its current node type, or a static node converter class uses reflection to dynamically alter the code at run-time as and when it is required.

In one embodiment of the invention, the validations are intended to ensure that no area allocated by a pattern attempts to fit into an area that cannot properly contain it. In one embodiment of the invention, validation is performed by a series of string/number attribute pairs that are intended to describe the area encompassed by a pattern. In one embodiment of the invention, an extensive system 2000 incorporating elements of existing collision detection code and mathematical or equational description of the areas occupied, is performed for validation. In this embodiment of the invention, one benefit is that validation pairs currently in use would not have to be known by a user adding new pattern entries into the system 2000. Instead of using these short-hand descriptions, in one embodiment of the invention, if genuine topographical descriptions of the areas they were allocating were added, it is known that the system 2000 would process them correctly.

In one embodiment of the invention, the system 2000 detects whether patterns can actually fit in its desired location. In one embodiment of the invention, the system 2000 chooses to display only that subset of the nodes that it actually has room to display, based on whatever policy decisions are added. In another embodiment of the invention, the system 2000 re-arranges the overall structure and moves the cramped category to a new area where it would have room to display its contents. In one embodiment of the invention, the system 2000 condenses down around products allocated with more space than is needed, freeing up this space to be used by other areas.

In one embodiment of the invention, each pattern is wholly and completely distinct. In this embodiment of the invention, even if two patterns differ only in the shape of area allocated to one of their Children, they are still entirely different patterns. In another embodiment of the invention, generic patterns are configured as necessary and do not require fully distinct configuration files, with all the associated duplication of data. For example, a square pattern that divides its internal space into either four squares, four circles, or a mix of squares and circles, differs only in some transform information between its various instances. Creating meta-patterns that can be customized and configured at run-time for an efficient implementation. In one embodiment of the invention, a single pattern allocates its space up between Children in a general lay out, expanding and contracting their precise dimensions in response to the weighting given by the amount of content in each category.

In one embodiment of the invention, the system 2000 handles ascribing sets of interaction behavior to the nodes in its system 2000. Each node, therefore, potentially has a set of interaction behaviors associated with it that the virtual world implementation holding it implements. The most simple of these is the capability of product-representing nodes to initiate purchasing transactions, or to add entries into the user's shopping cart. More extensively, a department's representation node might offer a listing of the products in that department, or of any special promotions on offer. Some nodes offer access to search functionality, or the opportunity to call for staff assistance. In one embodiment of the invention, each of these behaviors is mapped onto the node information, along with its positioning information and any commerce associations, when the structure node hierarchy was assembled by the model builder module 2020. In one embodiment of the invention, a bank of behaviors that would be expected to be supported is maintained, and these are to be assigned to nodes by the user or by decisions made in the template node system 2000.

In one embodiment of the invention, additional levels of content and functionality are added into a virtual world build. These are elements that are associated with a shop-front but are not inherent in the catalog data passed in to the system 2000. While the existing display node representation system 2000 can handle such elements as the building shell and departmental boundaries, there are other 'architectural' additions that might be required. In one embodiment of the invention, stairs or teleporters leading between different levels of a store, pathways leading from one department to another, or advertising or promotional offer displays in the store are added. These are all elements that are linked into the structure of the store being built, but resulting from the overall structure rather than the catalog data directly. While the template node system 2000 handles the distribution of categories and entries effectively, in one embodiment of the invention, an overarching structure template is incorporated. In one embodiment of the invention, this is a single, central unit that tracks the progression through the template node structure and ascribes elements based on the whole of the structure node hierarchy created. In one embodiment of the invention, the same kind of policy-based decision making used in the template nodes is applied here to decide what features to add, and where. In one embodiment of the invention, user-friendly features are added that a store might want to offer that are not directly related to their products, such as a main reception area, customer notices and display or performance areas for demonstrations.

One embodiment of the invention adds the ability to weight content for examination by the automated build system 2000. An example of this is to use the data present on the number of nodes below a given node to determine how much space should be allocated to it. Once that basic weighting has been used, more sophisticated handling can be added. In one embodiment of the invention, products that are particularly expensive or that are currently on offer could be given higher weightings, so that they would be given more room or be more prominently displayed. In one embodiment of the invention, which exact valuations are applied to particular products or categories is controlled by the user. In one embodiment of the invention, once they make their decisions. a weighting parser traverses the data node tree to implement the weightings before passing it to the model builder module 2020 to create the final StructureNode build.

Since the system 2000 can handle the introduction of new patterns at any time, users can add to the system 2000 to customize layouts to their exact needs. Simple layouts will suffice for a novice, or a small volume of entries to be displayed. For a more advanced user, very complex layouts can be created and interlinked with each other, useful for displaying a wide variety of different products. In one embodiment of the invention, since patterns are loaded from a file system based on their configuration files, it is easy to add in new ones to use. No program code has to be changed, they will be automatically detected by the management interface, and any template nodes that wish to use them just have to add in the pattern name into their list of patterns.

Another benefit of the modular nature of the system 2000 is its re-usability. In one embodiment of the invention, once a pattern has been defined and its XML configuration file written, it can be re-used in any number of individual builds. A pattern can even be used at different levels of a build hierarchy for very different purposes. The same simple spread used to lay out the departments of a store can be used to lay out products on a tabletop. This eliminates the need to have to create positioning data every single time a store is laid out, and offers a huge saving in time.

The automated build aspect of the system 2000 allows content generation to be determined in terms of policy decisions rather than as individual build-instances. If a user takes the time to define a complex and extensive template node structure, they can build a wide variety of different stores, all of which share a common theme and style. For large enterprises that want to make wide and consistent use of the system 2000, this is a distinct advantage. A single retailer can offer numerous different stores, each of which serves a particular sub-set of their product range or subsidiary of the main enterprise, and manage the design elements centrally. Since the system 2000 can expand to accommodate any number of test formats and scale of decision tree format, they can potentially be used for very sophisticated and detailed customization. Sub-trees of decision sets can be assembled once and then plugged into larger structures, making style and policy selection into pluggable components in the overall tree.

Since the information generated by the system 2000 is generic, three-dimensional positioning and association data it is not tied to any particular virtual world. Once a store has been built in the system 2000, all it requires is a virtual world adapter for the overall package and it can be imported into a new virtual setting. Customers do not have to worry about having to tailor their building efforts to each separate virtual implementation and therefore have much less of an overhead in moving into or experimenting with a variety of virtual world options. Consequently, if a particular virtual world undergoes major updates or becomes obsolete, the effort that was put into developing the build is not lost and can simply be moved across into a new virtual world.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a random access memory (RAM), a read-only memory (ROM), a rigid magnetic disk, an optical disk, etc. Current examples of optical disks include compact disk-read only memory (CD-ROM), compact disk-read/write (CD-R/W) and digital versatile disk (DVD).

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other modifications may occur to those ordinarily skilled in the art.

What is claimed is:

1. A method for three-dimensional virtual world pattern positioning, the method comprising:
    creating a three-dimensional pattern for a virtual world environment;
    sub-dividing the pattern into a plurality of sub-divisions each having a vector relative to a center of the pattern;
    creating, using a processor, a transform including a description of the pattern and shape information for each sub-division, wherein the shape information for each sub-division includes a scaling factor based on a longest dimension of the sub-division and a longest dimension of the pattern such that the longest dimension of the sub-division is relative to the longest dimension of the pattern;
    creating a portion of a virtual world environment by positioning the pattern;
    rendering the sub-divisions according to the transform; and
    storing the transform for reusing the pattern and sub-divisions in another virtual world environment.

2. The method of claim 1, wherein the shape information further includes an X-Y ratio, wherein the X-Y ratio describes the width of the sub-division in relation to the length of the sub-division.

3. The method of claim 1, wherein coordinates of the vector are offset positions relative to the center of the pattern to a center of the sub-divisions.

4. The method of claim 1, further comprising:
    receiving commerce information;
    building a node hierarchy with the commerce information;
    determining structure information of the commerce information;
    transferring the structure information to template node elements;
    using the template node elements to determine a pattern to use for creating a level of a virtual world by comparing the template node elements with the stored transform information.

5. The method of claim 4, wherein the node hierarchy includes:
    a location node including a positioning vector used to determine position of a display node and a terminal node, the display node includes an actual representation of a virtual world element, and the terminal node is an object to appear in the virtual world for interaction with visitors.

6. The method of claim 5, wherein the object is a store product.

7. The method of claim 1, wherein the sub-divisions can be further sub-divided.

8. A system for creating and reusing virtual world patterns, the system comprising:
    a processor coupled to a memory, wherein the processor is programmed to implement:
    an assembly module configured to:
        create a three-dimensional pattern for a virtual world environment;
        sub-divide the pattern into a plurality of sub-divisions each having a vector relative to a center of the pattern; and
        create a transform including a description of the pattern and shape information for each sub-division, wherein the shape information for each sub-division includes a scaling factor based on a longest dimension of the sub-division and a longest dimension of the pattern such that the longest dimension of the sub-division is relative to the longest dimension of the pattern; and
    a model builder module configured to:
        create a portion of a virtual world environment by positioning the pattern;
        render the sub-divisions according to the transform; and
        store the transform for reusing the pattern and sub-divisions in another virtual world environment.

9. The system of claim 8, wherein the model builder module is further configured to:
    receive commerce information;
    build a node hierarchy with the commerce information;
    determine structure information of the commerce information;
    transfer the structure information to template node elements; and
    use the template node elements to determine a pattern to use for creating a level of a virtual world by comparing the template node elements with the stored transform information.

10. The system of claim 9, wherein the model builder is configured to generate a location node including a positioning vector used to determine position of a display node and a terminal node, wherein the display node includes an actual representation of a virtual world element, and the terminal node is an object to appear in the virtual world for interaction with visitors.

11. The system of claim 8, wherein the model builder is configured to re-use the pattern for building a portion of another virtual world environment.

12. The system of claim 8, wherein the processor is further programmed to implement an excess handler configured to discard excess commerce information in a first mode and divide the commerce information between available spaces in the pattern.

13. The system of claim 8, wherein the shape information further includes an X-Y ratio, wherein the X-Y ratio describes the width of the sub-division in relation to the length of the sub-division.

14. A computer-readable storage device with an executable program stored thereon, wherein the program instructs a processor to perform:
creating a three-dimensional pattern for a virtual world environment;
sub-dividing the pattern into a plurality of sub-divisions each having a vector relative to a center of the pattern;
creating, using a processor, a transform including a description of the pattern and shape information for each sub-division, wherein the shape information for each sub-division includes a scaling factor based on a longest dimension of the sub-division and a longest dimension of the pattern such that the longest dimension of the sub-division is relative to the longest dimension of the pattern;
creating a portion of a virtual world environment by positioning the pattern;
rendering the sub-divisions according to the transform; and
storing the transform for reusing the pattern and sub-divisions in another virtual world environment.

15. The computer-readable storage device of claim 14, wherein the shape information further includes an X-Y ratio, wherein the X-Y ratio describes the width of the sub-division in relation to the length of the sub-division.

16. The computer-readable storage device of claim 14, wherein coordinates of the vector are offset positions relative to the center of the pattern to a center of the sub-divisions.

17. The computer-readable storage device of claim 14, further causing the computer to:
receive commerce information;
build a node hierarchy with the commerce information;
determine structure information of the commerce information;
transfer the structure information to template node elements;
use the template node elements to determine a pattern to use for creating a level of a virtual world by comparing the template node elements with the stored transform information.

18. The computer-readable storage device of claim 17, wherein the node hierarchy includes:
a location node including a positioning vector used to determine position of a display node and a terminal node, the display node includes an actual representation of a virtual world element, and the terminal node is an object to appear in the virtual world for interaction with visitors.

19. The computer-readable storage device of claim 14, wherein the object is a store product.

20. The computer-readable storage device of claim 14, wherein the sub-divisions can be further sub-divided.

* * * * *